United States Patent
Hirilishena et al.

(10) Patent No.: US 12,067,045 B2
(45) Date of Patent: Aug. 20, 2024

(54) ELECTRONIC APPARATUS AND CONTROLLING METHOD THEREOF

(71) Applicant: Samsung Electronics Co., Ltd., Suwon-si (KR)

(72) Inventors: Liudmyla Hirilishena, Kyiv (UA); Oleksii Pomyrlianu, Kyiv (UA); Tetiana Ignatova, Kyiv (UA); Donghyuk Lee, Suwon-si (KR); Olga Radyvonenko, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/429,517

(22) PCT Filed: Jul. 14, 2021

(86) PCT No.: PCT/KR2021/009014
§ 371 (c)(1),
(2) Date: Aug. 9, 2021

(87) PCT Pub. No.: WO2022/158663
PCT Pub. Date: Jul. 28, 2022

(65) Prior Publication Data
US 2023/0185843 A1    Jun. 15, 2023

(30) Foreign Application Priority Data

Jan. 25, 2021  (KR) .......................... 10-2021-0009940

(51) Int. Cl.
*G06F 16/532* (2019.01)
*G06F 3/04883* (2022.01)
(Continued)

(52) U.S. Cl.
CPC ........ *G06F 16/532* (2019.01); *G06F 3/04883* (2013.01); *G06F 16/538* (2019.01); *G06F 16/56* (2019.01); *G06V 40/28* (2022.01)

(58) Field of Classification Search
CPC ..................................................... G06F 16/532
See application file for complete search history.

(56) References Cited

U.S. PATENT DOCUMENTS 10,430,455 B2   10/2019  Jin et al.
10,503,775 B1 *  12/2019  Ranzinger ........... G06F 16/5854
(Continued)

FOREIGN PATENT DOCUMENTS

KR    10-2013-0059033 A    6/2013
KR    10-2013-0059040 A    6/2013
(Continued)

OTHER PUBLICATIONS

Vincent Wan et al., Google's Next-Generation Real-Time Unit-Selection Synthesizer using Sequence-To-Sequence LSTM-based Autoencoders, Interspeech 2017, Aug. 24, 2017, pp. 1143-1147, Stockholm, Sweden.
(Continued)

*Primary Examiner* — Van H Oberly
(74) *Attorney, Agent, or Firm* — Jefferson IP Law, LLP

(57) ABSTRACT

An electronic apparatus is provided. The electronic apparatus includes an input interface, a memory configured to store a plurality of first embedding vectors and content information related to each of the plurality of first embedding vectors, and at least one processor. The at least one processor is configured to obtain a sketch input of a user through the input interface, obtain a second embedding vector by inputting the sketch input to a neural network model, identify a first embedding vector, among the plurality of first embedding vectors, having a highest similarity with the second
(Continued)

embedding vector, and obtain and output content information corresponding to the identified first embedding vector.

16 Claims, 21 Drawing Sheets

(51) Int. Cl.
*G06F 16/538* (2019.01)
*G06F 16/56* (2019.01)
*G06V 40/20* (2022.01)

(56) References Cited

U.S. PATENT DOCUMENTS

| | | |
|---|---|---|
| 2006/0106793 A1 | 5/2006 | Liang et al. |
| 2008/0133505 A1 | 6/2008 | Bayley et al. |
| 2009/0313217 A1 | 12/2009 | Signorini et al. |
| 2011/0276396 A1* | 11/2011 | Rathod .............. G06Q 30/0282 707/706 |
| 2012/0054177 A1 | 3/2012 | Wang et al. |
| 2014/0095494 A1 | 4/2014 | Raichelgauz et al. |
| 2014/0195513 A1 | 7/2014 | Raichelgauz et al. |
| 2015/0331859 A1 | 11/2015 | Raichelgauz et al. |
| 2017/0206465 A1 | 7/2017 | Jin et al. |
| 2017/0262479 A1 | 9/2017 | Chester et al. |
| 2017/0364537 A1 | 12/2017 | Kariman |
| 2018/0089541 A1 | 3/2018 | Stoop et al. |
| 2018/0232400 A1 | 8/2018 | Saavedra Rondo |
| 2019/0026870 A1* | 1/2019 | Hu ............................ G06T 5/77 |
| 2020/0356592 A1* | 11/2020 | Yada ..................... G06F 16/538 |

FOREIGN PATENT DOCUMENTS

| | | |
|---|---|---|
| KR | 10-2015-0072973 A | 6/2015 |
| KR | 10-2020-0002332 A | 1/2020 |
| WO | 2017/168125 A1 | 10/2017 |

OTHER PUBLICATIONS

International Search Report dated Oct. 14, 2021, issued in International Application No. PCT/KR2021/009014.
Hannun et al., Deep Speech: Scaling up end-to-end speech recognition, arXiv:1412.5567v2 [cs.CL] Dec. 19, 2014.
Liu et al., SSD: Single Shot MultiBox Detector, arXiv:1512.02325v5 [cs.CV] Dec. 29, 2016.
Word embedding [https://en.wikipedia.org/wiki/Word_embedding], Aug. 14, 2014.

* cited by examiner

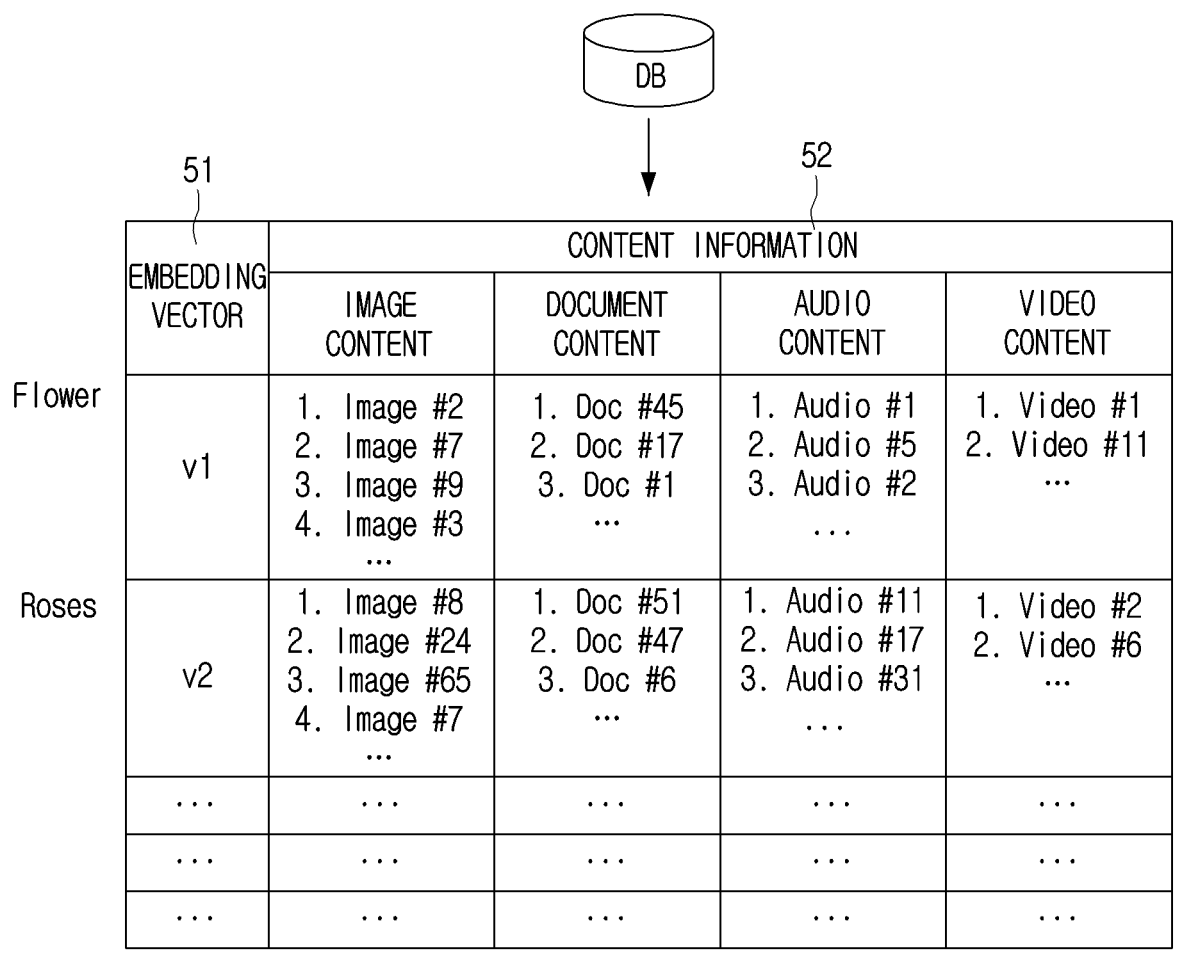

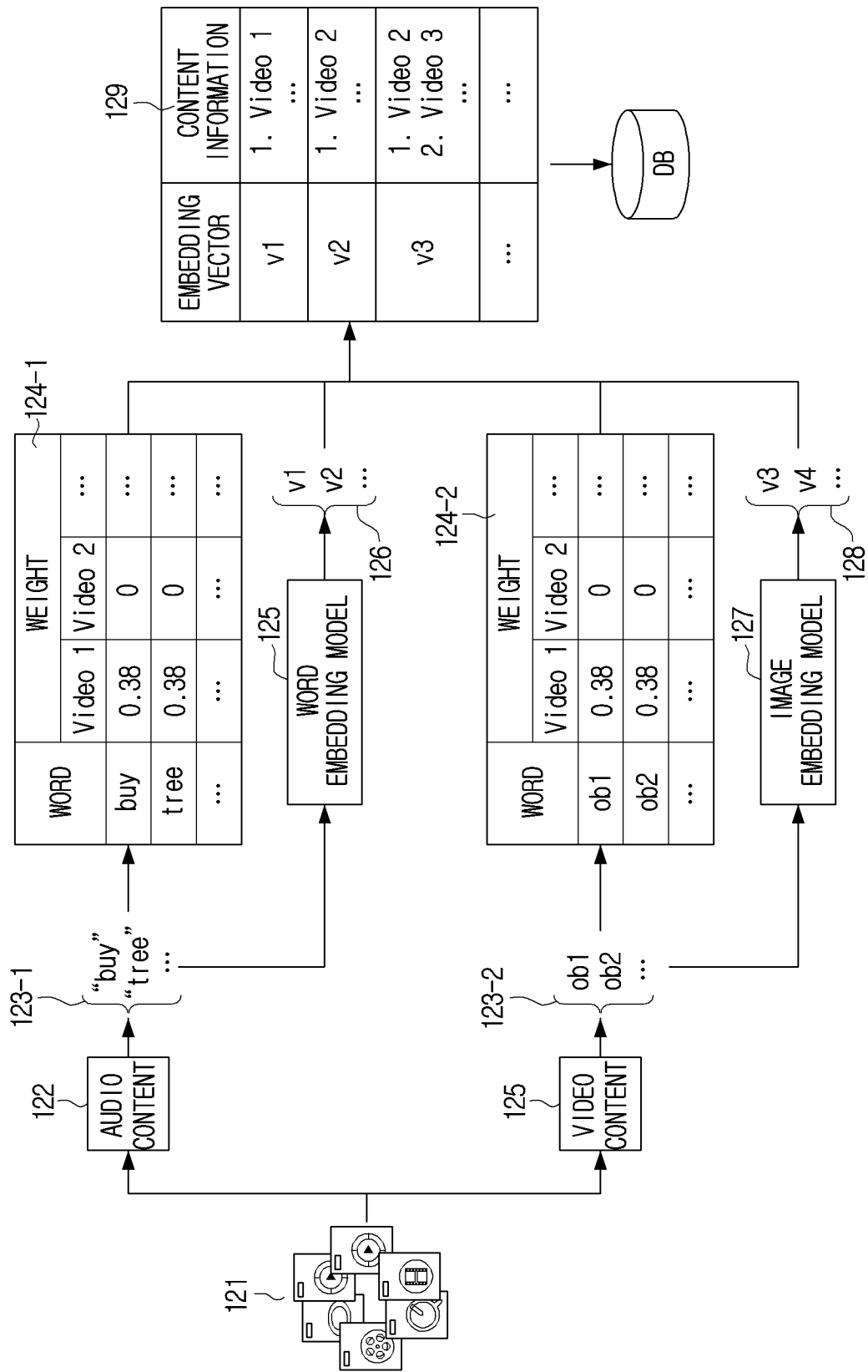

ELECTRONIC APPARATUS AND CONTROLLING METHOD THEREOF

CROSS-REFERENCE TO RELATED APPLICATION(S)

This application is a U.S. National Stage application under 35 U.S.C. § 371 of an International application number PCT/KR2021/009014, filed on Jul. 14, 2021, which is based on and claims priority of a Korean patent application number 10-2021-0009940, filed on Jan. 25, 2021, in the Korean Intellectual Property Office, the disclosure of which is incorporated by reference herein in its entirety.

TECHNICAL FIELD

The disclosure relates to an electronic apparatus and a controlling method thereof more particularly, the disclosure relates to an electronic apparatus which obtains and provides content information based on a sketch input of a user and a controlling method thereof.

BACKGROUND ART

Development of electronic technology enables a user terminal, such as a smart phone, to store enormous amount of data associated with various types of contents, such as image content, audio content, and video content.

As a vast amount of data may be present in a user terminal, a user may have a difficulty in finding specific content stored in the user terminal. For example, the user may not memorize at which place a particular image stored in the user terminal (e.g., the image capturing a receipt) is saved. In this case, the user may feel cumbersome as the user may have to find an image one by one from a lot of images stored in a gallery.

Accordingly, there is a necessity of an art to enable a user to search content information more conveniently and intuitively.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic apparatus for searching content information based on a sketch input of a user.

Additional aspects will be set forth in part in the description which follows and, in part, will be apparent from the description, or may be learned by practice of the presented embodiments.

The technical challenges of the disclosure are not limited to the above-mentioned technical challenges, and other technical challenges that are not mentioned will be apparent to a person skilled in the art in the art from the following description.

Technical Solution

In accordance with an aspect of the disclosure, an electronic apparatus is provided. The electronic apparatus includes an input interface, a memory storing a plurality of first embedding vectors and content information related to each of the plurality of first embedding vectors, and at least one processor, and the at least one processor may obtain a sketch input of a user through the input interface, obtain a second embedding vector by inputting the sketch input to a neural network model, identify a first embedding vector, among the plurality of first embedding vectors, having a highest similarity with the second embedding vector, and obtain and output content information corresponding to the identified first embedding vector.

The at least one processor may calculate a similarity through a cosine similarity between each of the plurality of first embedding vectors and the second embedding vector.

The neural network model may include an encoder to obtain a feature vector based on the sketch input, and a decoder to obtain the second embedding vector based on the feature vector.

The content information related to each of the plurality of first embedding vectors may include content information of a plurality of types, and the content information of a plurality of types may include image content, audio content, text content, and document content.

The at least one processor may obtain a user command to select one of the content information of the plurality of types, and identify and output content information corresponding to the selected type among the content information of the plurality of types.

The at least one processor may identify one of the plurality of types based on type information of the electronic apparatus, and identify and output the content information of the identified type among content information corresponding to the identified first embedding vector.

The electronic apparatus may further include a communication interface. The at least one processor may obtain type information of an external device connected to the electronic apparatus through the communication interface, identify a type among the plurality of types based on the type information, and identify the content information of the identified type among the information corresponding to the identified first embedding vector and transmit the identified information to the external device.

The input interface may include a touch panel, and may obtain the sketch input based on a user input to touch the touch panel.

The input interface may include a camera, and the at least one processor may obtain the gesture input of the user through the camera, and obtain the sketch input based on the gesture input.

In accordance with another aspect of the disclosure, a method of controlling an electronic apparatus is provided. The method includes storing a plurality of first embedding vectors and content information related to each of the plurality of first embedding vectors, obtaining a sketch input of a user, obtaining a second embedding vector by inputting the sketch input to a neural network model, identifying a first embedding vector, among the plurality of first embedding vectors, having a highest similarity with the second embedding vector, and obtaining and outputting content information corresponding to the identified first embedding vector.

The identifying the first embedding vector may comprise calculating a similarity through a cosine similarity between each of the plurality of first embedding vectors and the second embedding vector.

The neural network model may comprise an encoder to obtain a feature vector based on the sketch input, and a decoder to obtain the second embedding vector based on the feature vector.

Content information related to each of the plurality of first embedding vectors may comprise content information of a plurality of types, and wherein the content information of a plurality of types may comprise image content, audio content, text content, and document content.

The method may obtain a user command to select one of the content information of the plurality of types, wherein the obtaining and outputting the content information may comprise identifying the content information corresponding to the selected type among content information of the plurality of types, and outputting the identified content information.

The method may comprise identifying one of the plurality of types based on type information of the electronic apparatus, wherein the obtaining and outputting the content information may comprise identifying and outputting the content information corresponding to the identified type among content information corresponding to the identified first embedding vector.

The means for addressing the issue of the disclosure is not limited to the above-described solving means, and the solving means not mentioned herein will be apparent to a person skilled in the art to which the disclosure belongs, from the specification and the appended drawings.

Advantageous Effects

According to various embodiments of the disclosure, an electronic apparatus may search content information based on a sketch input of a user. Accordingly, a user's convenience and satisfaction may be improved.

The effects that may be obtained or predicted from the embodiment of the disclosure will be directly or implicitly described in the detailed description of embodiments of the disclosure. For example, various effects predicted according to embodiments of the disclosure will be described in the detailed description below.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating contents information stored in a database according to an embodiment of the disclosure;

FIG. 11B is a diagram illustrating a method of indexing video content according to an embodiment of the disclosure.

The same reference numerals are used to represent the same elements throughout the drawings.

MODE FOR CARRYING OUT THE DISCLOSURE

Figure 1:
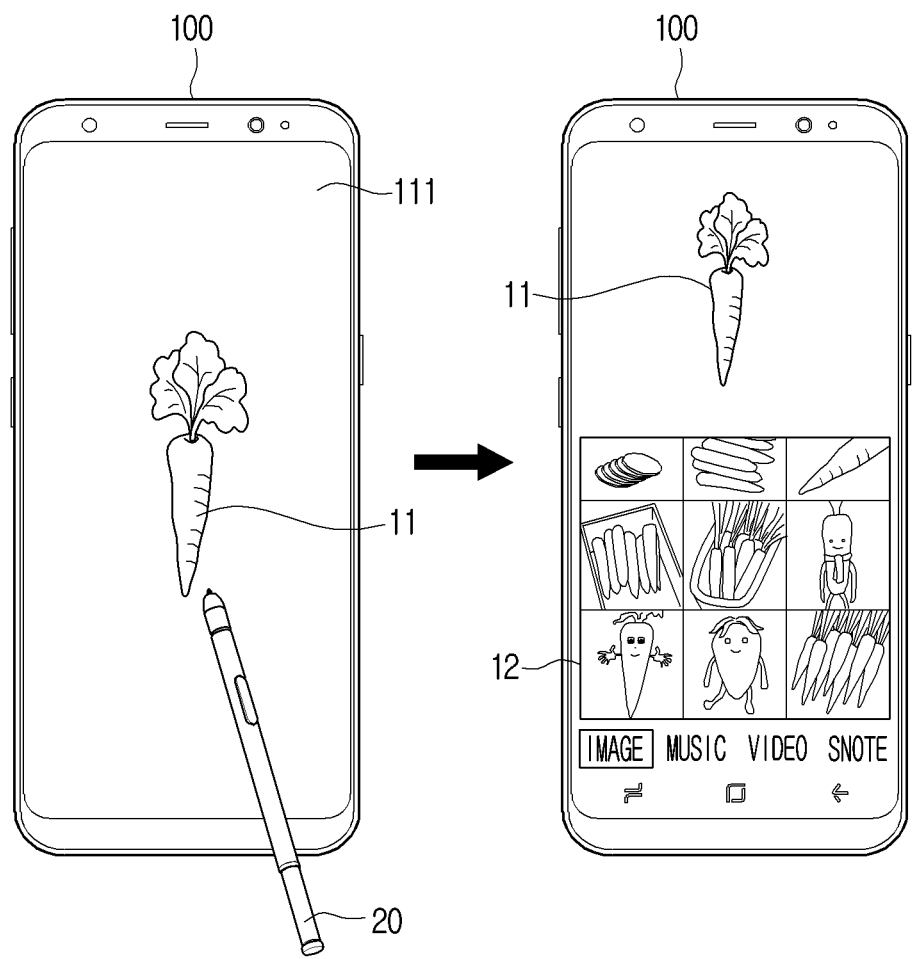
FIG. 1 is a diagram illustrating a concept of an electronic apparatus according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The example embodiments are capable of various modifications and have various embodiments of the disclosure, and specific embodiments are illustrated in the drawings and described in detail in the description. It should be understood, however, that it is not intended to limit the scope of the embodiments but includes all modifications, equivalents, and alternatives falling within the scope of the disclosure. When it is decided that a detailed description for the known art related to the disclosure may unnecessarily obscure the gist of the disclosure, the detailed description may be omitted.

The terms first, second, or the like, may be used to describe various components, but the components should not be limited by terms. The terms are used only to distinguish one component from another component.

A singular expression includes a plural expression, unless otherwise specified. It is to be understood that the terms, such as "comprise" or "consist of" are used herein to designate a presence of a characteristic, number, operation, element, component, or a combination thereof, and these terms do not to preclude a presence or a possibility of adding one or more of other characteristics, numbers, operations, elements, components or a combination thereof.

Hereinafter, various example embodiments of the disclosure will be described with reference to the accompanying drawings so that those skilled in the art may easily work the embodiment. However, the disclosure may be implemented in various different forms, and the disclosure is not limited to only the embodiments described herein. In addition, in the drawings, portions unrelated to the description may be omitted to avoid obscuring the disclosure, and similar elements will be denoted by similar reference numerals throughout the disclosure.

FIG. 1 is a diagram illustrating a concept of an electronic apparatus according to an embodiment of the disclosure.

Referring to FIG. 1, an electronic apparatus 100 may obtain a user's sketch input 11 through a touch panel 111. For example, the electronic apparatus 100 may obtain the sketch input 11 of a user touching the touch panel 111 using an external device (e.g., a stylus pen) 20. The sketch input 11 may mean a shape formed by an indication of a predetermined color when a touch position or a touch drag path received from a user through the touch panel 111 is displayed in a predetermined color.

The electronic apparatus 100 may provide information related to the sketch input 11 among the content information stored in the electronic apparatus 100 based on the sketch input 11. For example, the electronic apparatus 100 may display an image content 12 associated with the sketch input 11. However, the electronic apparatus 100 may provide various types of content information including audio content, video content, and document content. The type of content provided may be determined based on a user command selecting a type of content.

As described above, the electronic apparatus 100 may obtain and provide content information based on the user's sketch input 11 rather than a keyword referring to a specific object. Accordingly, even if a user who knows a shape of the object, but may not know a word referring to the object may search and see the content using the electronic apparatus 100. Accordingly, user convenience and satisfaction may be improved.

Figure 2:
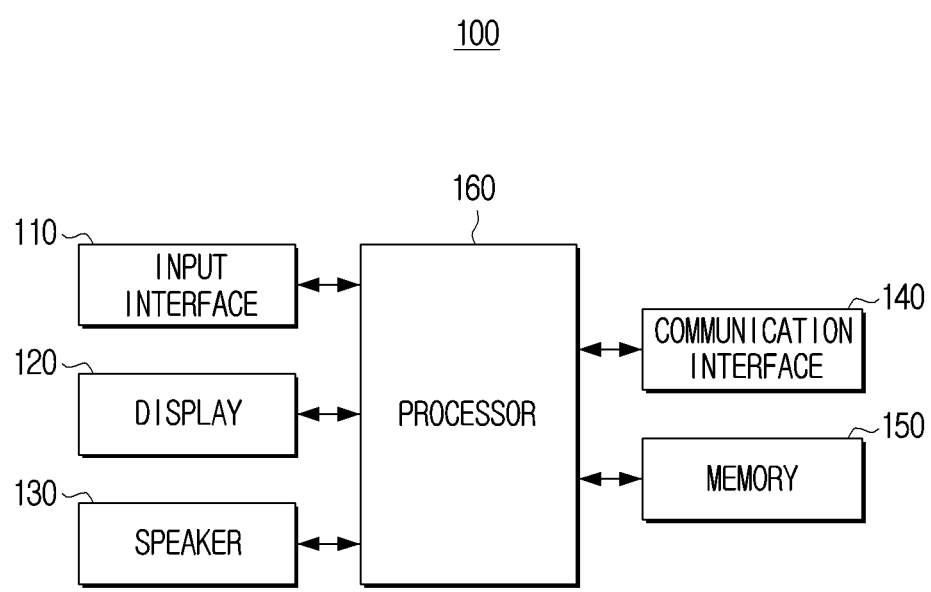
FIG. 2 is a block diagram of an electronic apparatus according to an embodiment of the disclosure.

FIG. 2 is a block diagram of an electronic apparatus according to an embodiment of the disclosure.

Referring to FIG. 2, the electronic apparatus 100 may include an input interface 110, a display 120, a speaker 130, a communication interface 140, a memory 150, and a processor 160. For example, the electronic apparatus 100 may be one of a smart phone, a tablet personal computer (PC), a television (TV), and a smart watch, but is not limited thereto. Hereinafter, each configuration of the electronic apparatus 100 will be described.

The input interface 110 is configured to obtain a user command. For example, the input interface 110 may be implemented as at least one of a touch panel for obtaining a touch input of a user and a camera for obtaining a gesture of a user, but is not limited thereto.

The display 120 may display various screens by the control of the processor 160. For example, the display 120 may display a picture corresponding to a sketch input inputted by a user. The display 120 may display an object (e.g., an eraser icon) for modifying the user's sketch input and an object (e.g., a search icon) for performing a search for the sketch input of a user. The display 120 may display an icon representing a type of content information. In addition, the display 120 may display the content identified based on the user's sketch input. The display 120 may be implemented as a liquid crystal display panel (LCD), an organic light emitting diodes (OLED), or the like.

The speaker 130 may output various audio signals under the control of the processor 160. In particular, the speaker 130 may output an audio signal corresponding to the audio content and the video content.

The communication interface 140 may include at least one circuit and may communicate with various types of external devices or external servers. For example, the communication interface 140 may receive information about the type of external device from an external device. In addition, the communication interface 140 may transmit information on the type of the external device and content information identified based on the user's sketch input to the external device.

The communication interface 140 may communicate with an external device or an external server according to various types of communication methods. For example, the communication interface 140 may perform data communication by wire or wirelessly. When communicating with an external device in a wireless communication method, the communication interface 140 may include at least one of a Wi-Fi communication module, a Bluetooth module, a cellular communication module, a third generation (3G) mobile communication module, a fourth generation (4G) mobile communication module, a fourth generation long term evolution (LTE) communication module, and a fifth generation (5G) mobile communication module.

The memory 150 may store instructions or data associated with components of the electronic apparatus 100 and an operating system (OS) for controlling the overall operation of and components of the electronic apparatus 100. In the memory 150, an embedding vector and content information corresponding to the embedding vector may be stored in association with each other. The memory 150 may store a neural network model trained to obtain an embedding vector based on a sketch input. The memory 150 may be implemented as a non-volatile memory (e.g., a hard disk, a solid state drive (SSD), a flash memory), a volatile memory, and the like.

The processor 160 may control overall operation of the electronic apparatus 100.

For example, the processor 160 may identify a plurality of first embedding vectors and content information associated with each of the plurality of first embedding vectors stored in the memory 150. The content information associated with each of the plurality of first embedding vectors may include content information of a plurality of types. For example, the content information of a plurality of types may include image content, audio content (e.g., music content), video content, text content, document content, and game content.

The processor 160 may obtain a user sketch input via an input interface. For example, the processor 160 may obtain a sketch input based on a user input touching the touch panel. Alternatively, the processor 160 may obtain a user's gesture input via a camera and obtain a sketch input based on the gesture input. In addition, the processor 160 may obtain a sketch input via an external device. For example, the processor 160 may obtain motion information of a user through a controller including a motion sensor and obtain a sketch input based on the obtained motion information. The processor 160 may obtain a sketch input based on a user input touching the touch panel through the stylus pen.

The processor 160 may input information on a sketch input of a user into a neural network model to obtain a second embedding vector. The information on the sketch input may include a red, green, blue (RGB) value corresponding to the sketch input and location information of a pixel. The neural network model may be trained to output an embedding vector based on information on a sketch input. The neural network model may include an encoder for obtaining a feature vector based on a sketch input, and a decoder for obtaining a second embedding vector based on the feature vector.

The processor 160 may identify a first embedding vector having the highest similarity with a second embedding vector among a plurality of first embedding vectors. The processor 160 may calculate a similarity based on cosine similarity between each of the plurality of first embedding vectors and the second embedding vector.

The processor 160 may obtain and output content information corresponding to the identified first embedding vector. The processor 160 may identify and output specific types of content information among a plurality of types of content information. As an example, the processor 160 may obtain a user command for selecting one of a plurality of types of content information. The processor 160 may identify and output content information corresponding to a selected type among a plurality of types of content information. As another example, the processor 160 may identify one type of the plurality of types based on the type information of the electronic apparatus 100. Specifically, if the electronic apparatus 100 is a TV, the processor 160 may identify the video content.

The processor 160 may output content through an external device. The processor 160 may transmit the identified content information to the external device. The processor 160 may obtain the type information of the external device and determine the type of content based on the type information. For example, when an external device is an earphone, the processor 160 may identify audio content among a plurality of types of content information.

In order to easily identify content information corresponding to a sketch input of a user among the content information stored in the memory 150, the processor 160 may build a database including content information. The processor 160 may identify a plurality of types of content information stored in the memory 150. The processor 160 may perform indexing on the identified plurality of types of content information. Here, the indexing refers to an operation of storing the embedding vector and the content information in association with each other. The processor 160 may store a plurality of indexed types of information in a database. A method of building a database will be described later with reference to FIGS. 8A to 11B.

The functionality associated with artificial intelligence according to the disclosure operates via the processor 160 and the memory 150. The processor 160 may be configured with one or a plurality of processors. The one or more processors may include, for example, a general purpose processor, such as, for example, and without limitation, a central processing unit (CPU), an application processor (AP), a digital signal processor (DSP), or the like, a graphics-only processor, such as a graphics processing unit (GPU), a vision processing unit (VPU), an artificial intelligence-only processor, such as a neural processing unit (NPU), or the like. The one or more processors control the processing of the input data in accordance with a predefined operating rule or artificial intelligence (AI) model stored in memory 150. Alternatively, if one or a plurality of processors is an AI-only processor, the AI-only processor may be designed with a hardware structure specialized for the processing of a particular AI model.

The pre-defined operating rule or AI model is made through learning. Being made through learning may mean that a basic AI model may be trained using a plurality of learning data by a learning algorithm, so that a predefined operation rule or AI model set to perform a desired feature (or a purpose) is generated. Such learning may be accomplished in a device itself in which artificial intelligence according to the disclosure is performed, and may be implemented through a separate server and/or system. Examples of learning algorithms include, but are not limited to, supervised learning, unsupervised learning, semi-supervised learning, generative adversarial neural network, reinforcement learning, or the like.

The AI model may be made through learning. Here, being made through learning may mean that a basic artificial intelligence model is trained by using a plurality of learning data by a learning algorithm, thereby creating a predefined operating rule or an artificial intelligence model configured to perform a desired characteristic (or purpose). The AI model may be including a plurality of neural network layers. Each of the plurality of neural network layers may have a plurality of weight values, and may perform a neural network algorithm through algorithm between an algorithm result of a previous layer and a plurality of weights. A plurality of weights which a plurality of neural network layers have may be optimized by a learning result of the AI model. For example, a plurality of weights may be updated such that a loss value or cost value obtained in the AI model during the learning process is reduced or minimized.

The AI model may be processed by an artificial intelligence dedicated processor designed in a hardware structure specialized for processing an artificial intelligence model. The artificial intelligence model may be made through learning. Here, being made through learning may refer that a basic artificial intelligence model is trained by using a plurality of learning data by a learning algorithm, thereby creating a predefined operating rule or an artificial intelligence model configured to perform a desired characteristic (or purpose). The AI model may include a plurality of neural network layers. Each of the plurality of neural network layers has a plurality of weights, and performs a neural network operation through an operation of a previous layer and an operation between the plurality of weights.

The artificial neural network may include, for example, and without limitation, a deep neural network (DNN), a convolutional neural network (CNN), a recurrent neural network (RNN), a restricted boltzmann machine (RNN), a deep belief network (DBN), a bidirectional recurrent deep neural network (BRDNN), deep Q-Networks, or the like.

Figure 3A:
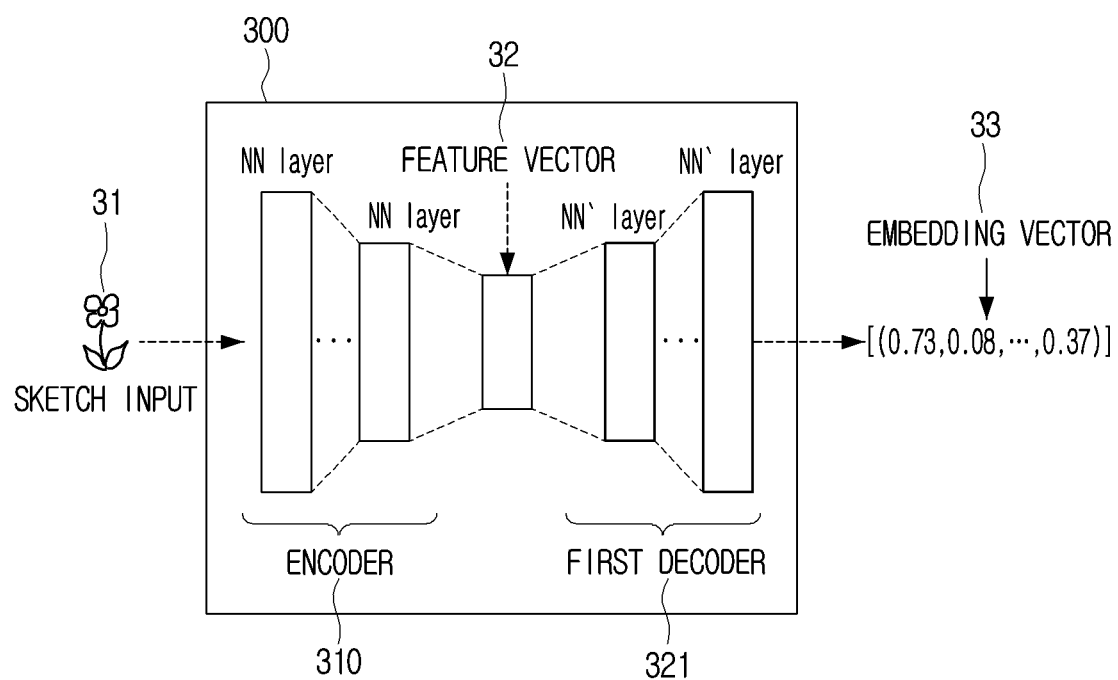
FIG. 3A is a diagram illustrating a neural network model according to an embodiment of the disclosure.

FIG. 3A is a diagram illustrating a neural network model according to an embodiment of the disclosure.

Referring to FIG. 3A, the electronic apparatus 100 may input a sketch input 31 obtained from the user to a neural network model 300 to obtain an embedding vector 33. The neural network model 300 may include an encoder 310 obtaining a feature vector 32 based on a sketch input 31 and a first decoder 321 obtaining an embedding vector 33 based on a feature vector 32. The encoder 310 and the first decoder 321 may include a convolutional neural network (CNN) and a recurrent neural network (RNN), respectively.

Figure 3B:
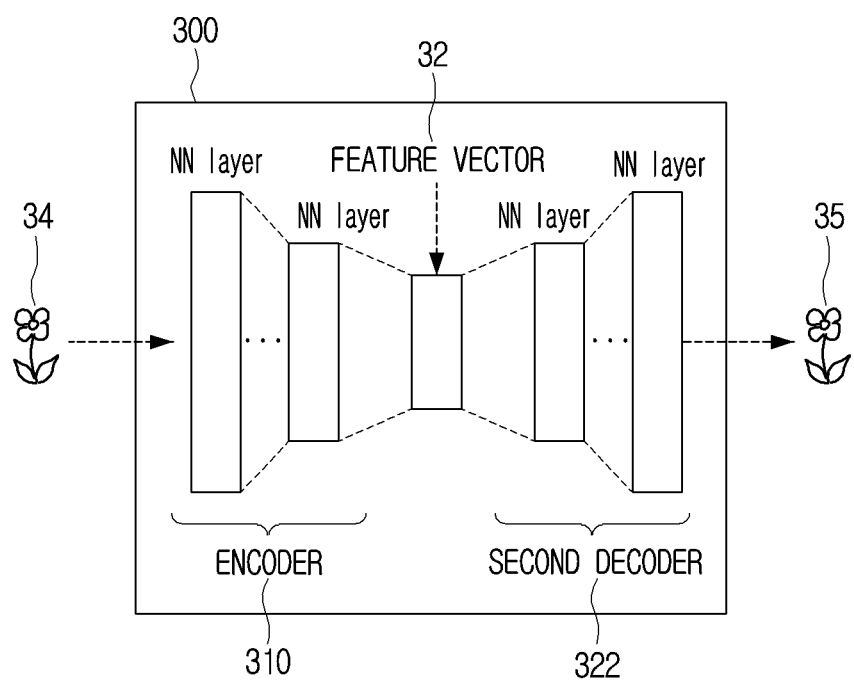
FIG. 3B is a diagram illustrating a learning method of a neural network model according to an embodiment of the disclosure.

FIG. 3B is a diagram illustrating a learning method of a neural network model according to an embodiment of the disclosure.

Referring to FIG. 3B, the encoder 310 may be trained to output a feature vector 32 based on the sketch input 34. The second decoder 322 may be trained to obtain a sketch output 35 based on the feature vector 32. The encoder 310 and the second decoder 322 may be trained such that the difference between the sketch input 34 and the sketch output 35 is less than a predetermined value. The parameters of the encoder 310 and the second decoder 322 may be updated such that the difference between the sketch input 34 and the sketch output 35 is less than a predetermined value. When learning of the encoder 310 is completed, the first decoder 321 may be trained. Referring back to FIG. 3A, the first decoder 321 may be trained to output the embedding vector 33 based on the feature vector 32. While the first decoder 321 is being trained, the parameters of the encoder 310 may be fixed.

Figure 4:
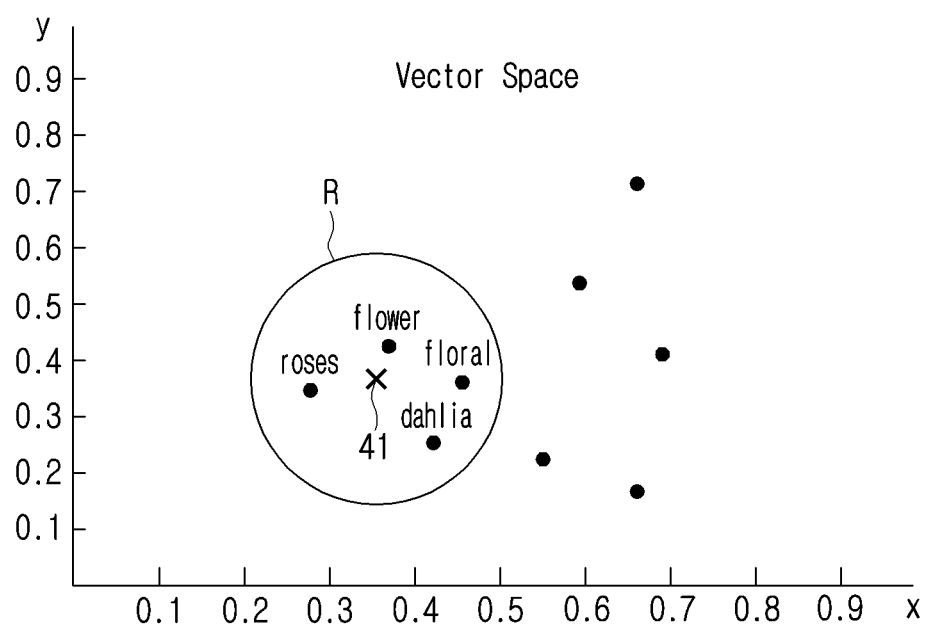
FIG. 4 is a diagram illustrating a similarity acquisition method according to an embodiment of the disclosure.

FIG. 4 is a diagram illustrating a similarity acquisition method according to an embodiment of the disclosure.

Referring to FIG. 4, the electronic apparatus 100 may obtain the similarity of the plurality of first embedding vectors stored in the memory 150 and the second embedding vector 41 corresponding to the sketch input. For example, the similarity between the first embedding vector and the second embedding vector 41 may be calculated based on a cosine distance or a cosine similarity. The electronic apparatus 100 may map the first embedding vector and the second embedding vector 41 onto the same vector space. The electronic apparatus 100 may identify a first embedding vector having the highest (or distance is nearest) similarity with the second embedding vector 41 among the plurality of first embedding vectors. For example, the identified first embedding vector may be an embedding vector corresponding to "flower".

The electronic apparatus 100 may calculate the similarity between a portion, not all, of the plurality of first embedding vectors and the second embedding vector 41. For example, the electronic apparatus 100 may identify at least one first embedding vector present within a predetermined range R with respect to the second embedding vector 41. The similarity between the identified at least one first embedding vector and the second embedding vector 41 may be calculated. Accordingly, the amount of computation for calculating the similarity may be reduced.

FIG. 5 is a diagram illustrating contents information stored in a database according to an embodiment of the disclosure.

Referring to FIG. 5, the electronic apparatus 100 may obtain and output content information corresponding to the identified first embedding vector. At this time, the electronic apparatus 100 may identify content information to be output based on indexed content information 52 stored in the database DB. In the database DB, an embedding vector 51 and content information 52 may be matched and stored. The embedding vector 51 may correspond to a word existing in the content information (e.g., "flower", "roses").

A plurality of types of content information 52 may be stored in the database DB. For example, the plurality of types of content information 52 may include image content, document content, audio content, and video content. Priority may be assigned to the plurality of types of content information 52 according to the degree of association with the embedding vector 51. For example, the image content corresponding to a first embedding vector v1 may include a second image (image #2), a seventh image (image #7), a ninth image (image #9), and a third image (image #3). At this time, the first rank is assigned to the second image (image #2), and the seventh image (image #7) may be assigned with a second rank that is subordinate to the first rank.

The relevance of the content information 52 and the embedding vector 51 may be calculated in a variety of ways. For example, if the content information 52 is document content, the relevance of the content information 52 and the embedding vector 51 may be calculated based on the number of words corresponding to the embedding vector 51 included in the content information 52. The more the number of words, the higher the relevance may be. As another example, if the content information 52 is image content, the relevance of the content information 52 and the embedding vector 51 may be calculated based an area which is occupied by the object corresponding to the embedding vector 51 from the content information 52. At this time, the greater the area, the greater the relevance.

The electronic apparatus 100 may identify content information to be output based on the assigned priority. When one content information is output, the electronic apparatus 100 may identify and output content information having the highest priority. For example, when one image content is output, the electronic apparatus 100 may identify and output a second image (image #2). When a plurality of content information is output, the electronic apparatus 100 may list and output content information according to the priority. For example, when four image contents are output, the electronic apparatus 100 may identify the second image (image #2), the seventh image (image #7), the ninth image (image #9), and the third image (image #3) and output the images in order.

The information stored in the database DB may include information received from an external server, as well as content information stored in the memory 150. For example, content information associated with a sketch input received from an external server may be stored in a database (DB).

Figure 6A:
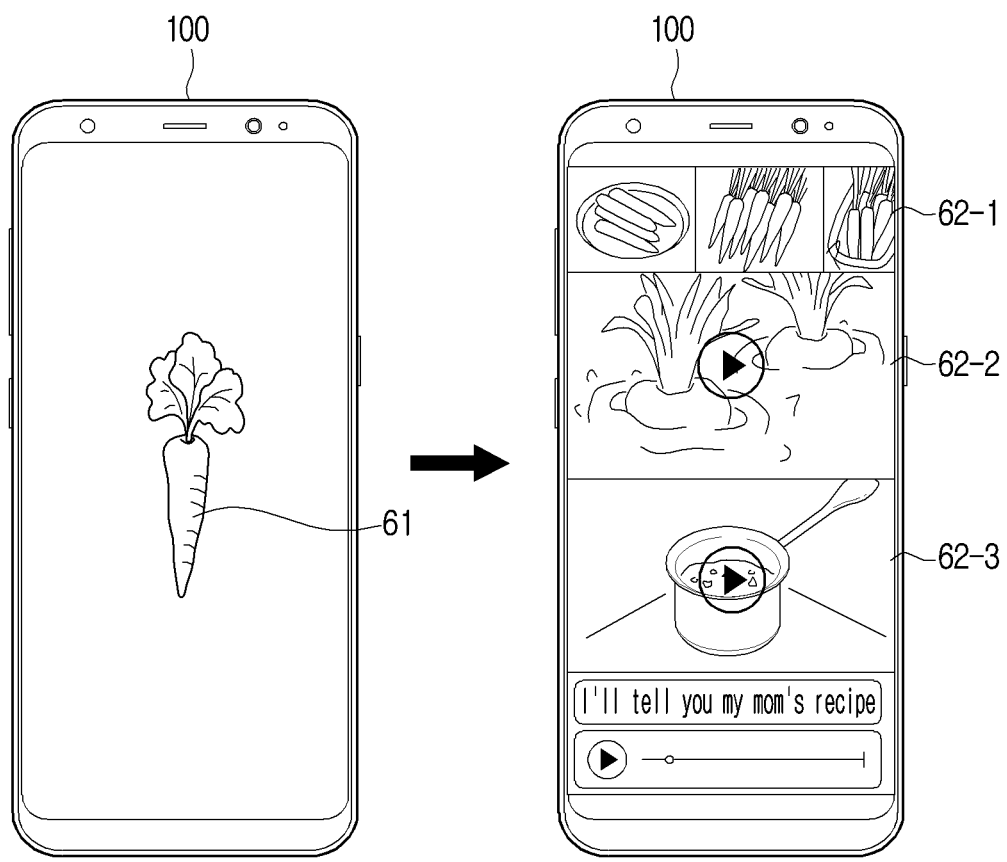
FIG. 6A is a diagram illustrating a content output method according to an embodiment of the disclosure.
Figure 6B:
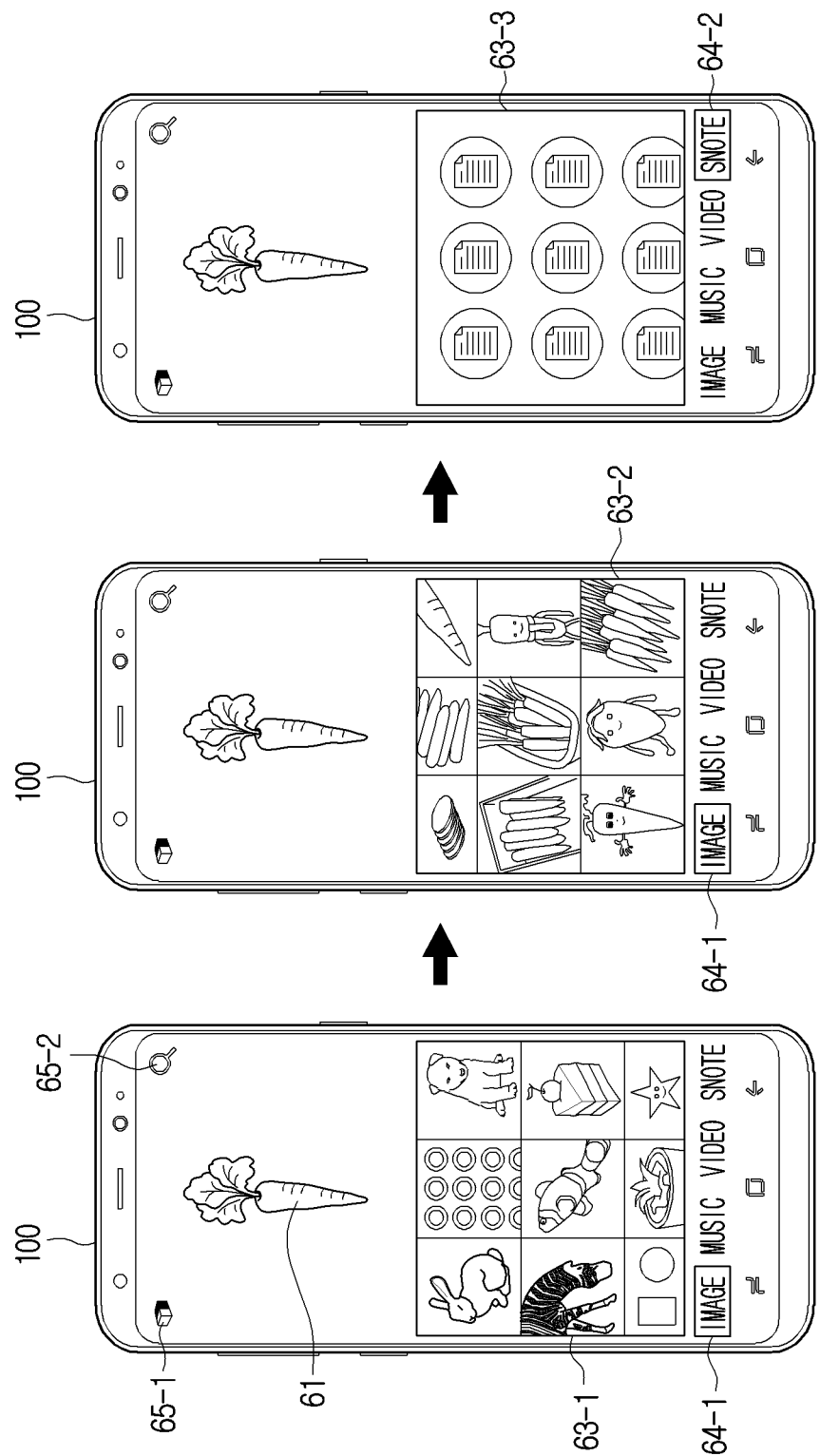
FIG. 6B is a diagram illustrating a content output method according to an embodiment of the disclosure.

FIGS. 6A and 6B are diagrams illustrating a content output method according to various embodiments of the disclosure.

Referring to FIG. 6A, the electronic apparatus 100 may obtain a sketch input 61 from a user. For example, the sketch input 61 may correspond to the shape of "carrot". The electronic apparatus 100 may identify and output a plurality of types of content information associated with the sketch input 61. For example, the electronic apparatus 100 may output an image content 62-1 and a video content 62-2 including the "carrot". The electronic apparatus 100 may display at least one image included in the image content 62-1. The electronic apparatus 100 may display a thumbnail image corresponding to the video content 62-2. The electronic apparatus 100 may overlay and display a user interface (UI) element (e.g., a play icon) for playing the video content 62-2 in a thumbnail image.

In addition, the electronic apparatus 100 may output an audio content 62-3 (e.g., a "carrot cake recipe") with "carrot" as a theme. At this time, the electronic apparatus 100 may display the title of the audio content 62-3 and a UI element for play of the audio content 62-3.

The electronic apparatus 100 may display the content information for each type according to a priority. For example, the electronic apparatus 100 may display the image content with first rank, the second rank, and the third rank of priority among the plurality of image contents. The electronic apparatus 100 may differently display the size of the image content according to the priority. For example, the size of the first image content, which has the first rank of priority, may be larger than the second image content, which has the second rank of the priority that is subordinate to the first rank.

The electronic apparatus 100 may output only content information of a type selected by a user from among a plurality of types of content information.

Referring to FIG. 6B, the electronic apparatus 100 may display any content information stored in the memory 150. At this time, the electronic apparatus 100 may display the content information of the currently selected type. For example, if an image type 64-1 is selected, the electronic apparatus 100 may display an arbitrary image content 63-1 stored in the memory 150. The electronic apparatus 100 may also display a first object 65-1 for modifying the user's sketch input 61 and a second object 65-2 for executing a search for the sketch input 61.

While displaying an arbitrary image content 63-1 stored in the memory 150, the electronic apparatus 100 may obtain the user's sketch input 61. The electronic apparatus 100 may obtain a user command for selecting the second object 65-2. When a user command is obtained, the electronic apparatus 100 may obtain a first embedding vector corresponding to the sketch input 61. The electronic apparatus 100 may identify a second embedding vector having the highest similarity with the first embedding vector in the database DB. Further, the electronic apparatus 100 may obtain a plurality of types of content information stored in association with a second embedding vector in a database (DB).

The electronic apparatus 100 may display the obtained content information. The electronic apparatus 100 may display the content information of the currently selected type. For example, if the image type 64-1 is selected, the electronic apparatus 100 may display the image content 63-2 among the obtained plurality of types of content information. While displaying the image content 63-2, the electronic apparatus 100 may obtain a user command to select the document type 64-2. The electronic apparatus 100 may display a document content 63-3 among the plurality of obtained types of content information.

FIGS. 7A, 7B, 7C, and 7D are diagrams illustrating a method of providing content information according to various embodiments of the disclosure.

Figure 7A:
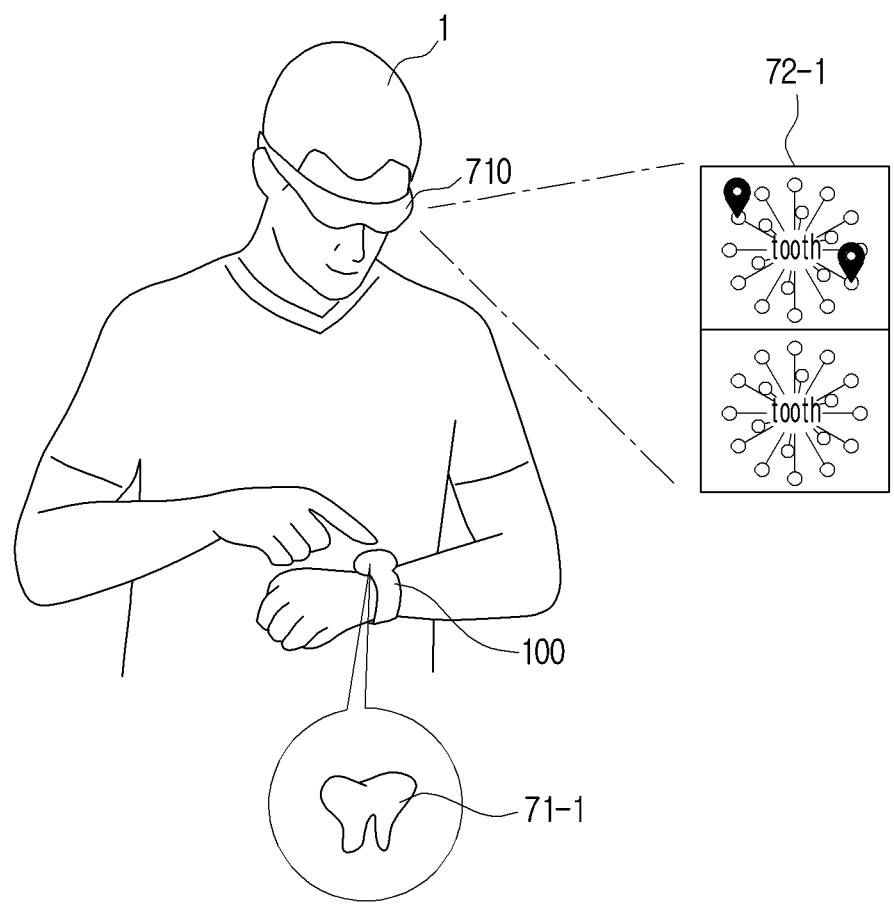
FIG. 7A is a diagram illustrating a method of providing content information according to an embodiment of the disclosure.

Referring to FIG. 7A, the electronic apparatus 100 is a smart watch, and an external device 710 may be an augmented reality (AR) glass. The electronic apparatus 100 may obtain a sketch input 71-1 from a user 1 through a touch panel. The sketch input 71-1 may correspond to the shape of a particular object (e.g., tooth). The electronic apparatus 100 may obtain information 72-1 associated with an object (i.e., tooth). For example, the electronic apparatus 100 may obtain text content associated with the object. Specifically, the text content may include a list of words associated with "tooth". The electronic apparatus 100 may transmit information related to the obtained object to the external device 710. The external device 710 may display information 72-1 associated with the received object.

Figure 7B:
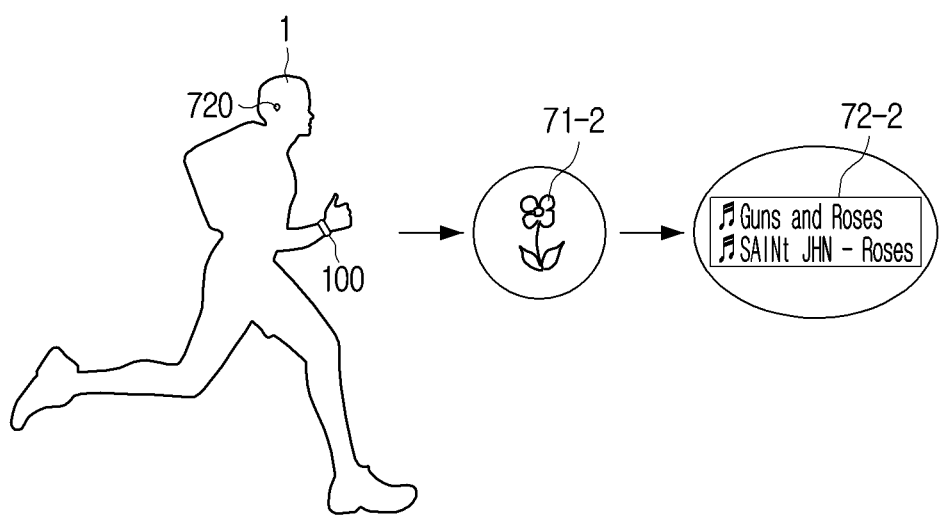
FIG. 7B is a diagram illustrating a method of providing content information according to an embodiment of the disclosure.

Referring to FIG. 7B, the electronic apparatus 100 is a smart watch and the external device 720 may be an earphone. The electronic apparatus 100 may obtain a sketch input 71-2 of the user 1 through the touch panel. The electronic apparatus 100 may obtain the content information 72-2 associated with the sketch input 71-2. For example, if the sketch input 71-2 corresponds to "rose", the content information 72-2 may include an audio file for music content associated with the "rose". At this time, the electronic apparatus 100 may display a text (e.g., a title of the music content) corresponding to the content information 72-2. When the electronic apparatus 100 displays a plurality of music content lists, the electronic apparatus 100 may obtain a command for selecting specific music content from the plurality of music content from the user 1. The electronic apparatus 100 may transmit information about the music content selected by the user to the external device 720. The external device 720 may output the received content information 72-2. The external device 720 may output an audio signal for music content associated with the "rose".

The electronic apparatus 100 may identify specific types of content information among a plurality of types of content information associated with the sketch input 71-2 based on information on the external device 720. The information about the external device 720 may include type information and spec information of the external device 720. For example, if the external device 720 is an earphone, the electronic apparatus 100 may identify audio content among the plurality of types of content information. Accordingly, the user 1 may receive content corresponding to the external device 720 and improve the satisfaction and convenience of the user 1. The information about the external device 720 may be pre-stored in the memory 150 or received from the external device 720.

Figure 7C:
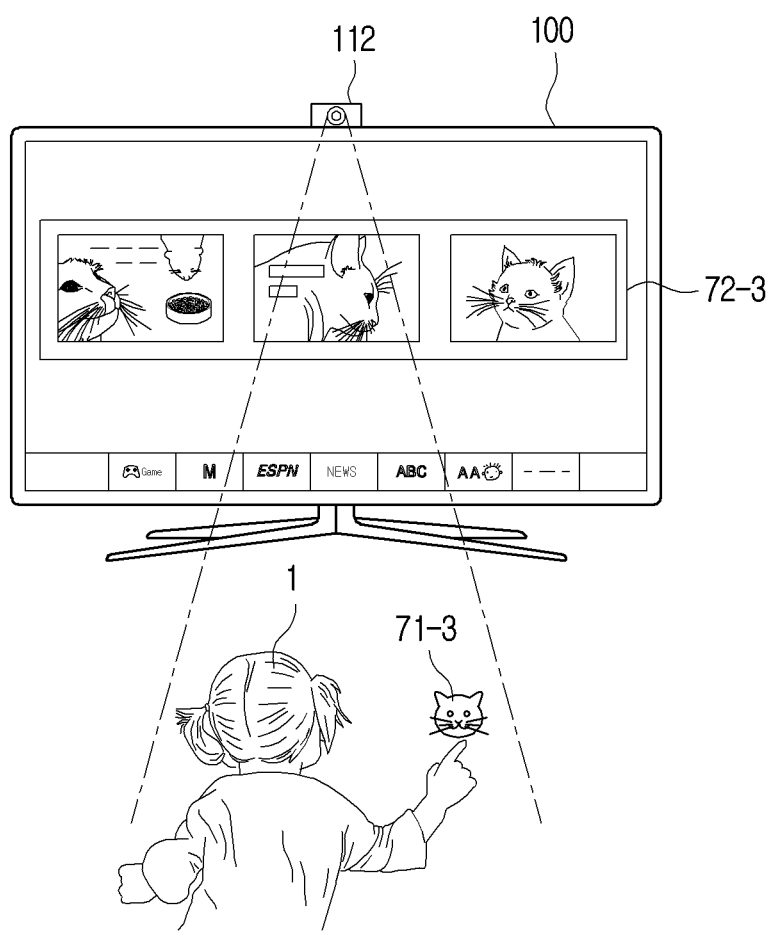
FIG. 7C is a diagram illustrating a method of providing content information according to an embodiment of the disclosure.

Referring to FIG. 7C, the electronic apparatus 100 may be a TV. The electronic apparatus 100 may obtain a plurality of images capturing the user 1 through the camera 112. The electronic apparatus 100 may analyze the plurality of obtained images to obtain a gesture of the user 1. The electronic apparatus 100 may obtain the sketch input 71-3 of the user 1 based on the obtained gesture. For example, the sketch input 71-3 may correspond to a "cat".

The electronic apparatus 100 may obtain content information associated with the sketch input 71-3. For example, the obtained content information may include a thumbnail image and a video file for a plurality of video content including "cat". The electronic apparatus 100 may display a thumbnail image 72-3 for each of the plurality of video content. When a user command for selecting one of the thumbnail images 72-3 is obtained, the electronic apparatus 100 may execute a video file corresponding to the selected thumbnail image to display the video content.

The electronic apparatus 100 may identify specific types of content information among a plurality of types of content information related to the sketch input 71-3 based on a predetermined priority. For example, if the electronic apparatus 100 is a TV, the electronic apparatus 100 may identify the video content as the first rank and identify the image content as the second rank that is subordinate to the first rank. Accordingly, the user 1 may receive content corresponding to the electronic apparatus 100 and improve the satisfaction and convenience of the user 1.

Figure 7D:
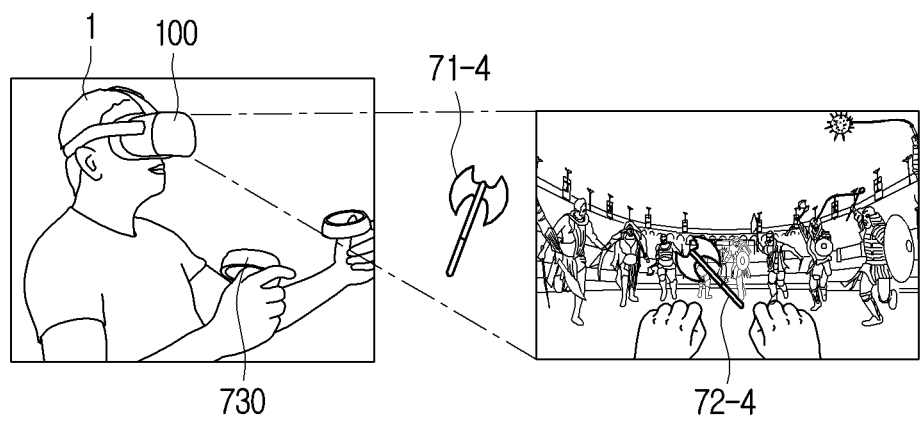
FIG. 7D is a diagram illustrating a method of providing content information according to an embodiment of the disclosure.

Referring to FIG. 7D, the electronic apparatus 100 may be an augmented reality (AR) glass and the external device 730 may be a controller connected to the electronic apparatus 100. The external device 730 may include a motion sensor (e.g., an inertial measurement unit (IMU) sensor). While the electronic apparatus 100 displays the game content, the external device 730 may obtain the motion information of the user 1 and transmit the motion information to the electronic apparatus 100. The electronic apparatus 100 may obtain the sketch input 71-4 based on the received motion information. For example, the sketch input 71-4 may correspond to an item associated with the game content.

The electronic apparatus 100 may obtain and output content information associated with the sketch input 71-4 based on the sketch input 71-4. For example, the electronic apparatus 100 may obtain and display the object 72-4 corresponding to the sketch input 71-4. The electronic apparatus 100 may identify the content type based on the information about the application which is currently executed. For example, if the sketch input 71-4 is obtained while the game application is being executed, the electronic apparatus 100 may identify the game content among the plurality of content types. The electronic apparatus 100 may identify game content associated with the sketch input 71-4 among the plurality of types of content in the database DB.

A method for obtaining a sketch input, a method for obtaining content information based on a sketch input, and a method for outputting content information are described above. In order to easily obtain the content information based on the sketch input, the electronic apparatus 100 may perform indexing on the content information and build a database including the content information. Hereinafter, a method of building a database by the electronic apparatus 100 will be described.

Figure 8A:
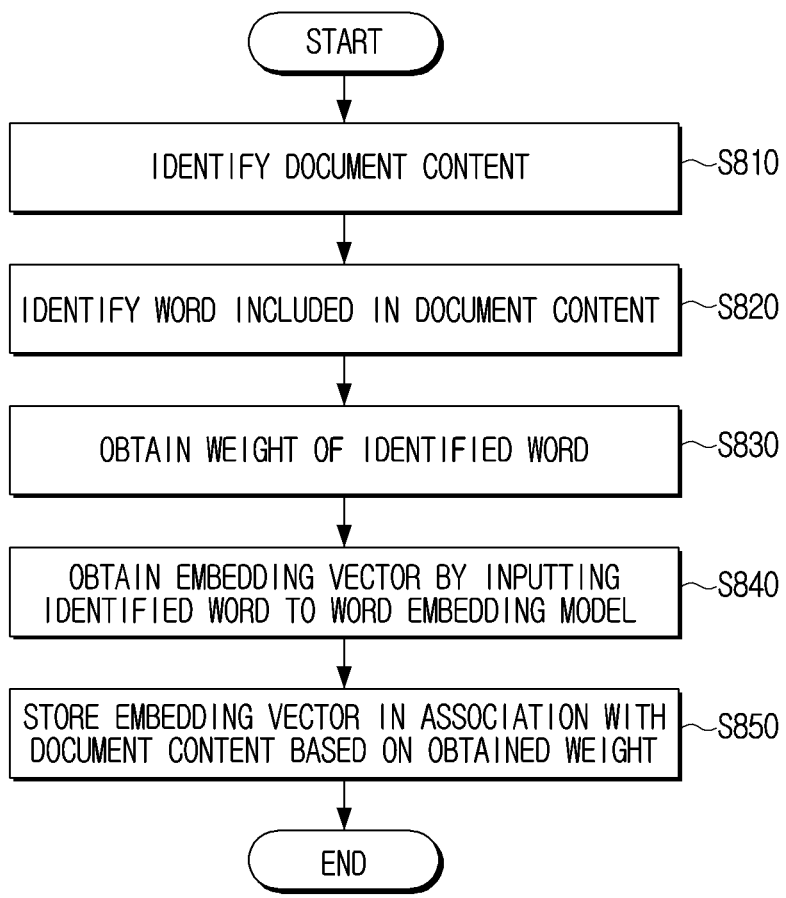
FIG. 8A is a flowchart illustrating a method of indexing document content according to an embodiment of the disclosure.

FIG. 8A is a flowchart illustrating a method of indexing document content according to an embodiment of the disclosure.

Referring to FIG. 8A, the electronic apparatus 100 may identify document content in operation 5810. For example, the electronic apparatus 100 may identify the content stored in the memory 150. The electronic apparatus 100 may identify a word included in the identified document content in operation 5820, and obtain a weight for the identified word in operation 5830. Here, the weight may mean a value indicating how much words are important in the document content. For example, the electronic apparatus 100 may calculate a weight based on the following Equation 1 called "TF-IDF".

$$w_{x,y} = tf_{x,y} \times \log\left(\frac{N}{df_x}\right) \quad \text{Equation 1}$$

Here, $tf_{x,y}$ means the numbers or frequencies of the word x appearing in the document y and $df_x$ means the number of documents including the word x, and N means the total number of the documents.

The electronic apparatus 100 may input the identified word into a word embedding model to obtain an embedding vector in operation 5840. The word embedding model may be a neural network model trained to obtain an embedding vector corresponding to a word based on a word. In addition, the word embedding model may be implemented based on a word-to-vector (Word2Vec) algorithm.

The electronic apparatus 100 may associate and store the embedding vector and the document content based on the obtained weight in operation 5850. The electronic apparatus 100 may match the embedding vector corresponding to the identified word and the document content including the identified word. For example, the electronic apparatus 100 may perform indexing on the document content. The electronic apparatus 100 may assign priority to the document content identified in the order of high weights. For example, when indexing the plurality of document contents with respect to the first word, the electronic apparatus 100 may assign a first rank to the first document content having the largest weight for the first word among the plurality of document contents. The electronic apparatus 100 may assign a second rank that is subordinate to the first rank for the second document having a lower weight to the first word than the first document content. The electronic apparatus 100 may perform indexing on each of the plurality of document content and store the indexed plurality of document content in a database.

Figure 8B:
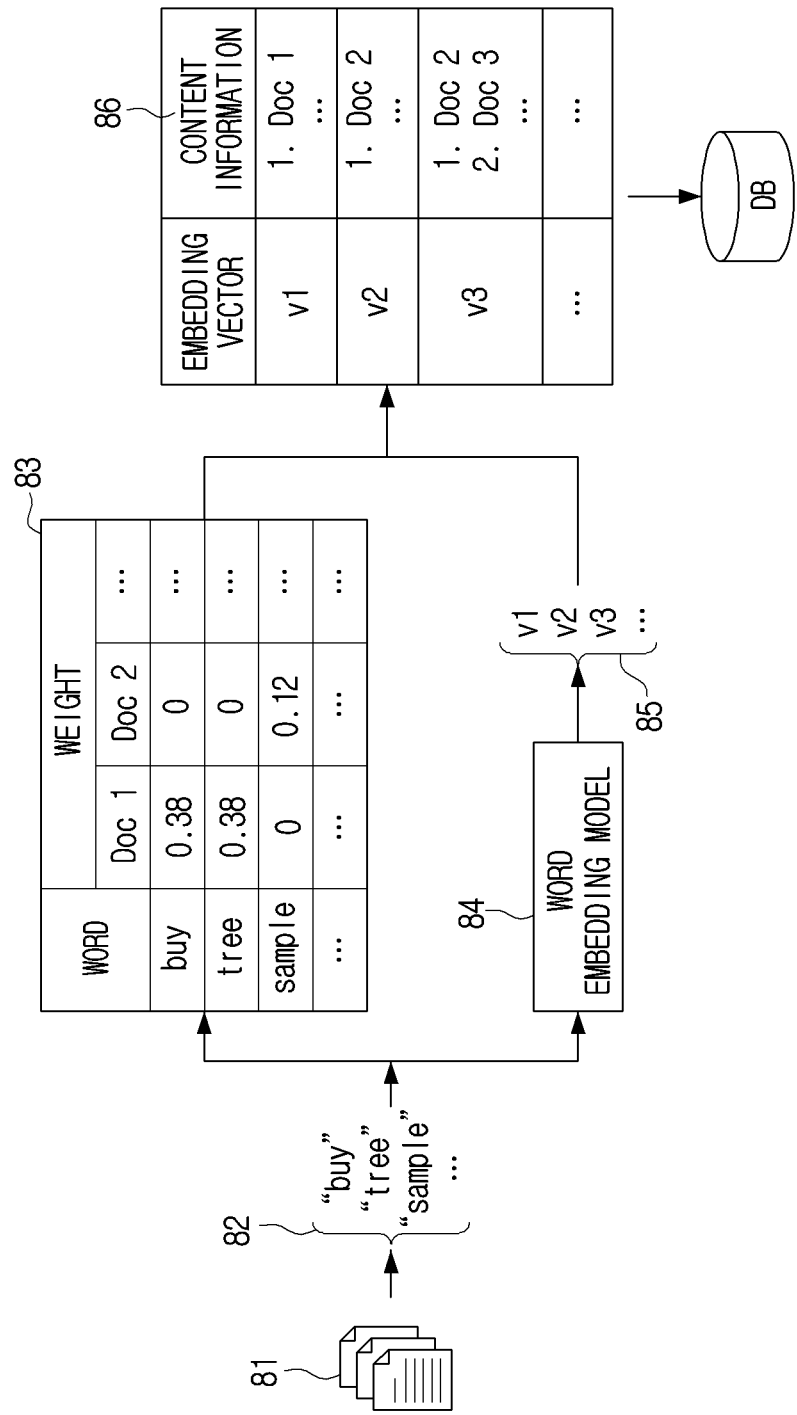
FIG. 8B is a diagram illustrating a method of indexing document content according to an embodiment of the disclosure.

FIG. 8B is a diagram illustrating a method of indexing document content according to an embodiment of the disclosure.

Referring to FIG. 8B, the electronic apparatus 100 may identify document content 81 and scan the document content 81 to identify a plurality of words 82 included in the document content 81. For example, the plurality of words 82 may include a first word "buy", a second word "tree", and a third word "sample". The electronic apparatus 100 may obtain a weight 83 representing the importance of each of the plurality of words 82 in the document content 81. For example, the weight of the first word "buy" in the first document content "Doc 1" may be 0.38. In addition, the weight of the third word "sample" in the second document content "Doc 2" may be 0.12.

The electronic apparatus 100 may input a plurality of words 82 into the word embedding model 84 to obtain an embedding vector 85 corresponding to each of the plurality of words 82. For example, the embedding vector 85 may include a first vector v1, a second vector v2, and a third vector v3 corresponding to the first word "buy", the second word "tree", and the third word "sample", respectively. The electronic apparatus 100 may associate and store the embedding vector 85 and the content information 86. For example, the electronic apparatus 100 may match the document content including the first word "buy" and the first vector v1 and store the same in the database DB.

Figure 9A:
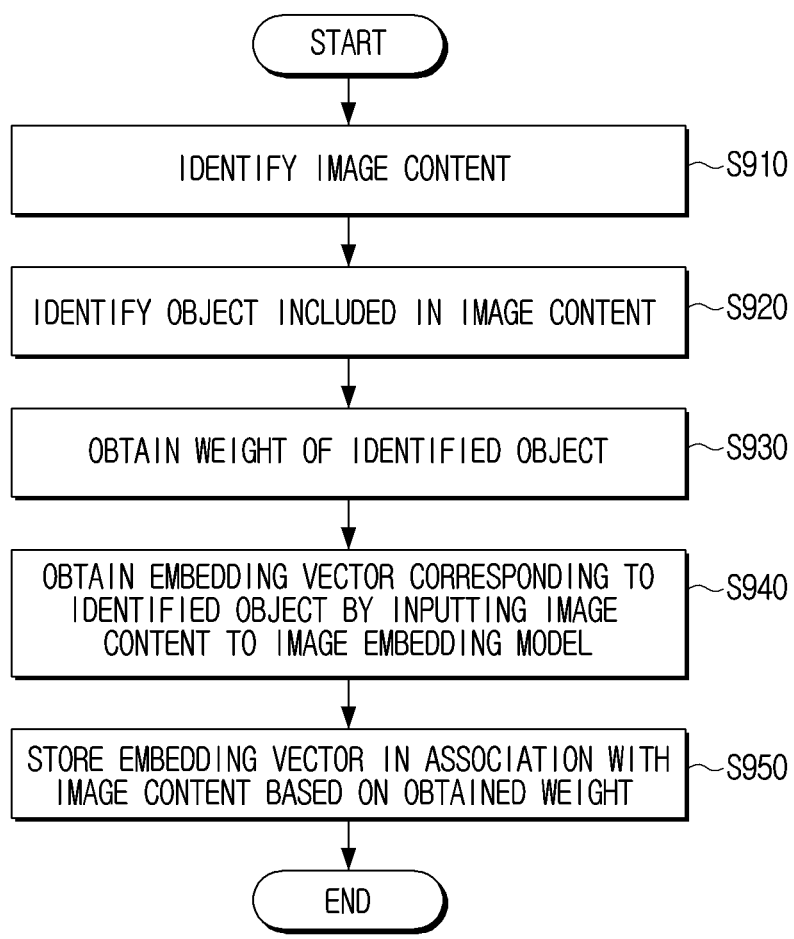
FIG. 9A is a flowchart illustrating a method of indexing image content according to an embodiment of the disclosure.
Figure 9B:
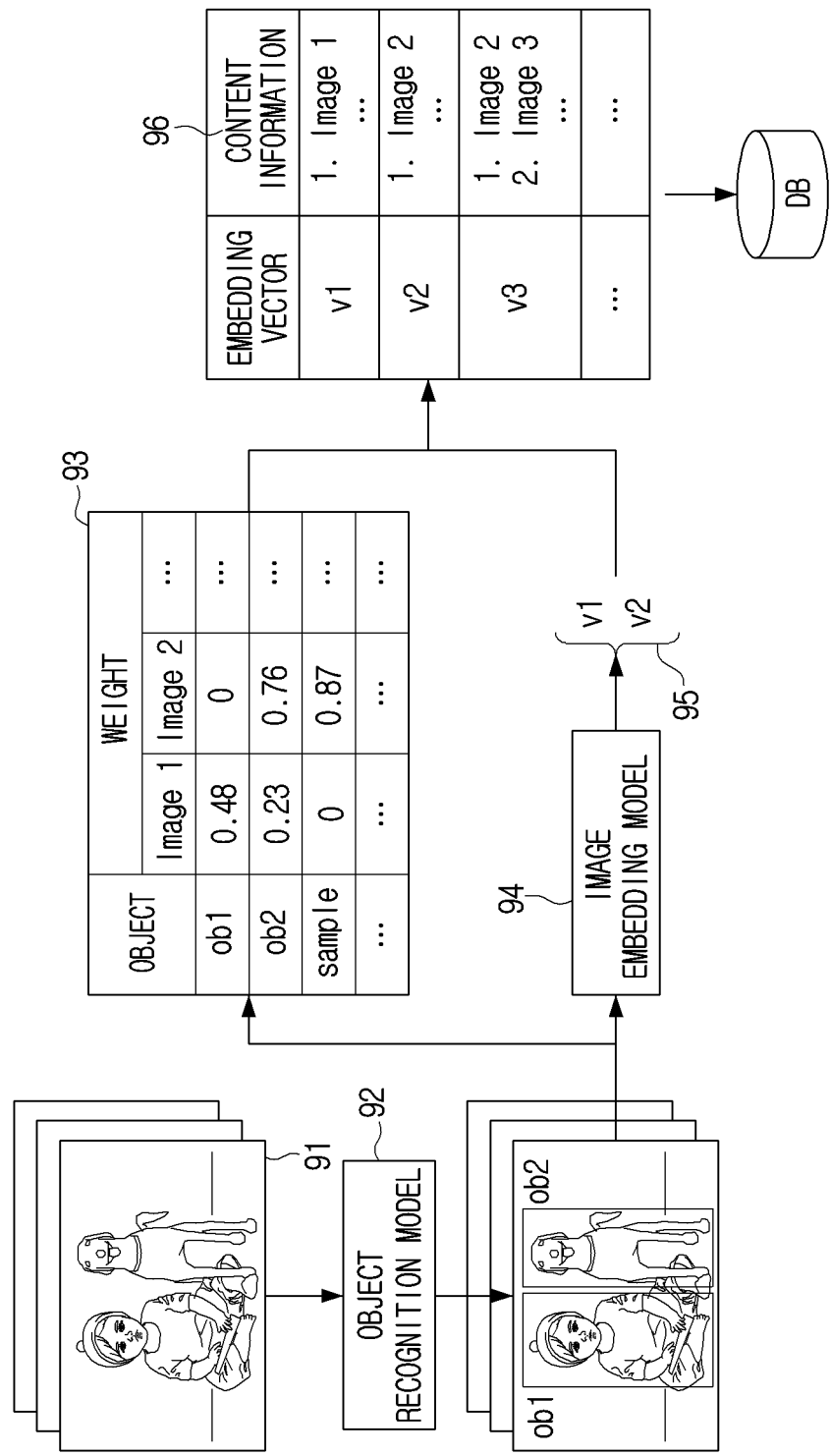
FIG. 9B is a diagram illustrating a method of indexing image content according to an embodiment of the disclosure.

FIG. 9A is a flowchart illustrating a method of indexing image content according to an embodiment of the disclosure. FIG. 9B is a diagram illustrating a method of indexing image content according to an embodiment of the disclosure.

Referring to FIG. 9A, the electronic apparatus 100 may identify the image content in operation 5910 and may identify an object included in the image content in operation 5920.

Referring to FIG. 9B, the electronic apparatus 100 may input an image content 91 to a trained object recognition model 92 to obtain information on objects ob1 and ob2 included in the image content 91. The information ob1 and ob2 for the object may include location information of the object (e.g., coordinate information of a bounding box corresponding to the object) and identification information of the object in the image content.

The electronic apparatus 100 may obtain a weight 93 for the identified object in operation 5930. For example, the electronic apparatus 100 may obtain a weight 93 indicating the importance of the object in the image content based on Equation 2.

$$Ims(obj_x) = \frac{Width_x \times Height_x}{Width \times Height} P(y|x) \qquad \text{Equation 2}$$

Here, image importance score (Iis) may refer to a weight 93 indicating an importance of an object from an image content, $obj_x$ may refer to an object identified from the image content, $Width_x$ may refer to a width of a bounding box of the object x, $Height_x$ may refer to a height of a bounding box of the identified object x, Width may refer to a width of an image (or image content) where the object x is detected, Height may refer to the height of the image (or image content) from which the object x is detected, and P(y|x) may refer to a probability that the object x corresponds to the class y. Referring to FIG. 9B, the electronic apparatus 100 may obtain weights 93 from image contents of each of a first object (ob1), a second object (ob2), and a third object (ob3).

The electronic apparatus 100 may input image content to an image embedding model to obtain an embedding vector corresponding to the identified object in operation 5940. Referring to FIG. 9B, the electronic apparatus 100 may input the image content 91 to the image embedding model 94 to obtain an embedding vector 95 corresponding to the first object ob1 and the second object ob2. The electronic apparatus 100 may obtain a first vector v1 corresponding to the first object ob1 and a second vector v2 corresponding to the second object ob2. The image embedding model 94 may be a neural network model trained to obtain an embedding vector for an object included in the image content based on the image content.

The electronic apparatus 100 may associate and store the embedding vector and the image content based on the obtained weight in operation 5950. The electronic apparatus 100 may assign priority to the image content in the order of high weight, match the embedding vector and the image content, and store the same. For example, referring to FIG. 9B, the electronic apparatus 100 may match the embedding vectors v1, v2, and v3 for each of the plurality of objects and the content information 96 including the object to be stored in the database DB.

Figure 10A:
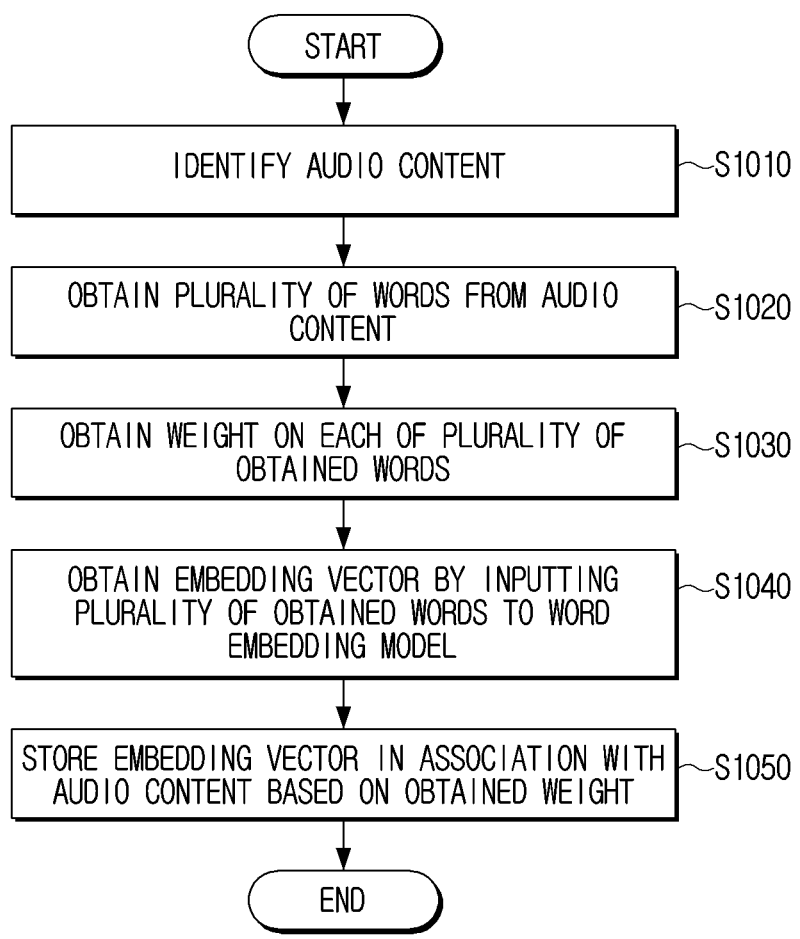
FIG. 10A is a flowchart illustrating a method of indexing audio content according to an embodiment of the disclosure.

FIG. 10A is a flowchart illustrating a method of indexing audio content according to an embodiment of the disclosure.

Referring to FIG. 10A, the electronic apparatus 100 may identify audio content in operation S1010 the audio content and obtain a plurality of words from the audio content in operation S1020. For example, the electronic apparatus 100 may input information about audio content into a text acquisition model to obtain a plurality of words. Here, the information about the audio content may include an audio sequence and a sound spectrogram for the audio content. The text acquisition model may include a recurrent neural network (RNN) as a neural network model trained to obtain text based on information on the audio content.

The electronic apparatus 100 may obtain a weight for each of the plurality of obtained words in operation S1030. The electronic apparatus 100 may calculate a weight for the obtained word, such as operation 5830 described above. For example, the electronic apparatus 100 may calculate a weight for the word based on Equation 1. The electronic apparatus 100 may input the obtained plurality of words into a word embedding model to obtain an embedding vector in operation S1040. The word embedding model may correspond to the word embedding model 84 of FIG. 8B. The electronic apparatus 100 may associate and store the embedding vector and the image content based on the obtained weight in operation S1050.

Figure 10B:
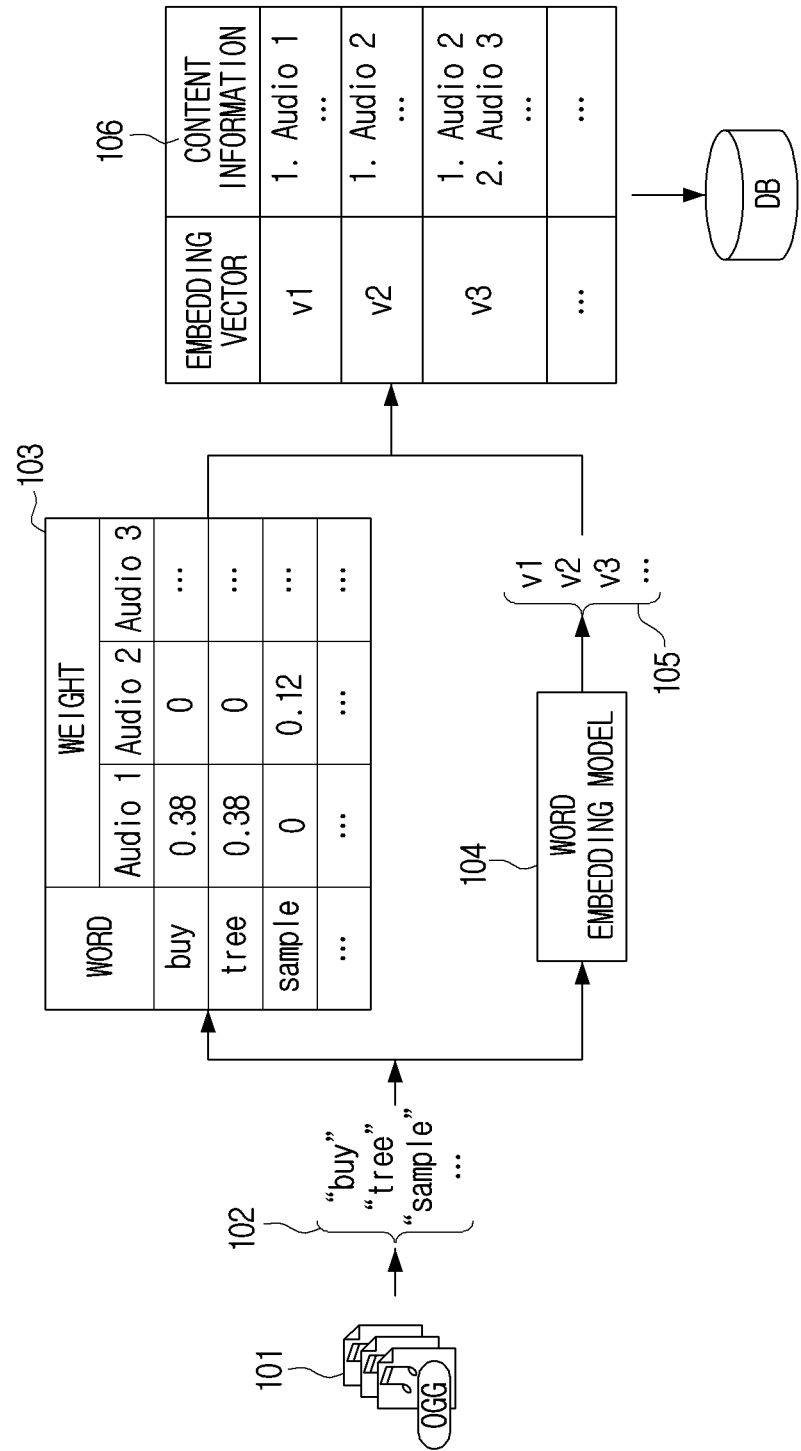
FIG. 10B is a diagram illustrating a method of indexing audio content according to an embodiment of the disclosure.

FIG. 10B is a diagram illustrating a method of indexing audio content according to an embodiment of the disclosure.

Referring to FIG. 10B, the electronic apparatus 100 may obtain a plurality of words 102 from audio content 101. The electronic apparatus 100 may obtain a weight 103 for each of the plurality of words 102. The electronic apparatus 100 may input a plurality of words 102 into a word embedding model 104 to obtain an embedding vector 105 for each of the plurality of words 102. The electronic apparatus 100 may match the embedding vector 105 with content information 106 including the plurality of audio content and store the matched content information 106 in a database (DB).

Figure 11A:
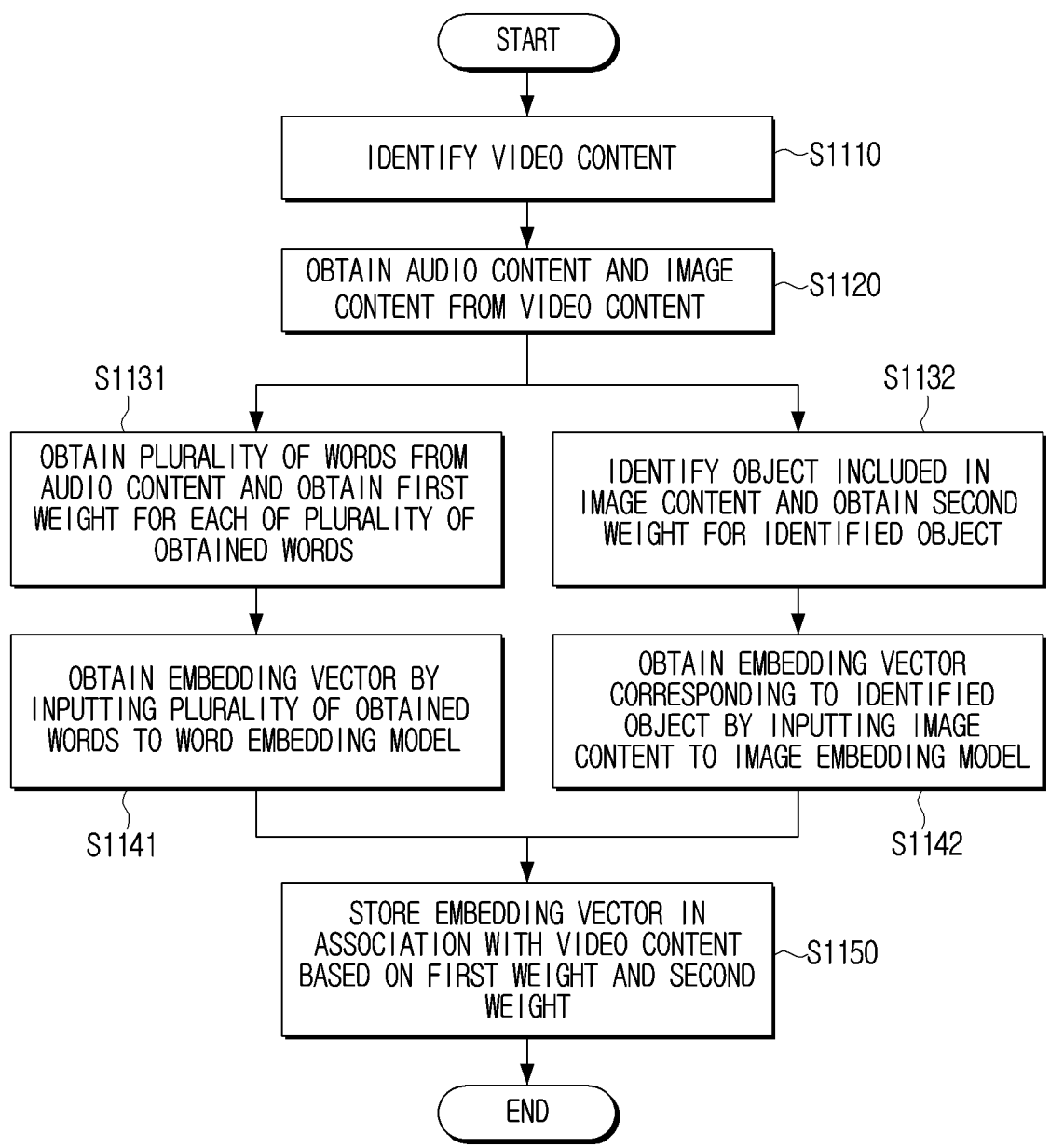
FIG. 11A is a flowchart illustrating a method of indexing video content according to an embodiment of the disclosure.

FIG. 11A is a flowchart illustrating a method of indexing video content according to an embodiment of the disclosure. FIG. 11B is a diagram illustrating a method of indexing video content according to an embodiment of the disclosure.

Referring to FIG. 11A, the electronic apparatus 100 may identify the video content in operation S1110 and obtain audio content and image content from the identified video content in operation S1120.

Referring to FIG. 11B, the electronic apparatus 100 may separate the audio component and the image component of the video content 121 to obtain audio content 122 and image content 125.

The electronic apparatus 100 may obtain a plurality of words from the audio content and obtain a first weight for each of the plurality of obtained words in operation S1131. The operation may correspond to operations S1020 and S1030, and a detailed description thereof will be omitted. Referring to FIG. 11B, the electronic apparatus 100 may obtain a plurality of words 123-1 from the audio content 122 and obtain a first weight 124-1 for each of the plurality of words 123-1.

The electronic apparatus 100 may input the obtained plurality of words into a word embedding model 124 to obtain an embedding vector in operation S1141. Referring to FIG. 11B, the electronic apparatus 100 may input a plurality of words 123-1 into a word embedding model 124 to obtain an embedding vector 126. For example, the electronic apparatus 100 may obtain embedding vectors v1 and v2 for each of the plurality of words 123-1.

The electronic apparatus 100 may identify an object included in the video content 121 and obtain a second weight for the identified object in operation S1132. The operation may correspond to operations 5920 and 5930, and the detailed description thereof will be omitted. Referring to FIG. 11B, the electronic apparatus 100 may obtain information 123-3 for each of the plurality of objects ob1 and ob2 from the video content 121. The electronic apparatus 100 may obtain a second weight 124-2 for each of the plurality of objects ob1 and ob2.

The electronic apparatus 100 may input the image content to an image embedding model to obtain an embedding vector corresponding to the identified object in operation S1142. The operation may correspond to the above-described operation 5940, and the detailed description thereof will be omitted. Referring to FIG. 11B, the electronic apparatus 100 may obtain an embedding vector 128 corresponding to each of the plurality of objects ob1 and ob2 using an image embedding model 127.

The electronic apparatus 100 may associate and store the embedding vector and the video content 121 based on the first weight and the second weight in operation S1150.

Referring to FIG. 11B, the electronic apparatus 100 may match the embedding vectors v1 and v2 for each of the plurality of words 123-1 and the embedding vector v3 corresponding to the object ob1 with content information 129 and store the same in the database DB.

In the same manner as described above, the content information 129 for each type may be matched with the embedding vector and stored. Accordingly, the electronic apparatus 100 may build the database as shown in FIG. 5.

Figure 12:
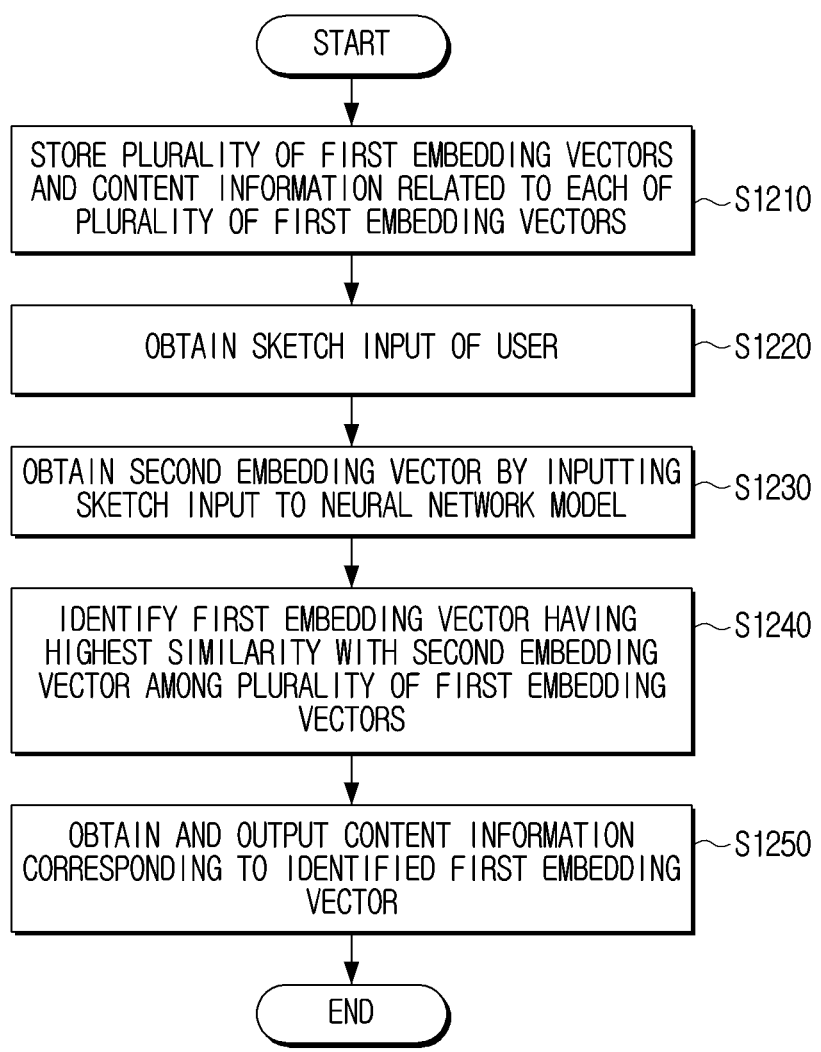
FIG. 12 is a flowchart illustrating a method of controlling an electronic device according to an embodiment of the disclosure.

FIG. 12 is a flowchart illustrating a method of controlling an electronic device according to an embodiment of the disclosure.

Referring to FIG. 12, the electronic apparatus 100 may store a plurality of first embedding vectors and content information related to each of the plurality of first embedding vectors in operation S1210. The electronic apparatus 100 may build a database by indexing content information stored in the memory 150. The operation of the embodiment has been described with reference to FIGS. 8A to 11B and a detailed description thereof will be omitted.

The electronic apparatus 100 may obtain a user sketch input in operation S1220. For example, the electronic apparatus 100 may obtain a sketch input based on a user input touching the touch panel. Alternatively, the electronic apparatus 100 may obtain a gesture input of a user through the camera and obtain a sketch input based on the gesture input.

The electronic apparatus 100 may input a sketch input into a neural network model to obtain a second embedding vector in operation S1230. The neural network model may include an encoder for obtaining a feature vector based on a sketch input, and a decoder for obtaining a second embedding vector based on the feature vector. The electronic apparatus 100 may identify a first embedding vector, among the plurality of first embedding vectors, having a highest similarity with the second embedding vector in operation S1240. The electronic apparatus 100 may calculate a similarity through a cosine similarity between each of the plurality of first embedding vectors and the second embedding vector. The electronic apparatus 100 may obtain and output content information corresponding to the identified first embedding vector in operation S1250. A method of outputting content of the electronic apparatus 100 has been described above and a detailed description will be omitted.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments, such as the procedures and functions described herein may be implemented with separate software modules. Each of the software modules may perform one or more of the functions and operations described herein.

According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium is not a medium storing data for a short period of time, such as a register, a cache, or a memory, but may refer to a medium that semi-permanently stores data and is readable by a machine. Specific examples of the non-transitory computer-readable medium may include a compact disc (CD), a digital versatile disc (DVD), a hard disk drive, a Blu-ray disc, a universal serial bus (USB), a memory card, and a read only memory (ROM).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
   an input interface comprising at least one of a touch panel or a camera;
   a communication interface comprising circuitry;
   memory storing one or more computer programs, a neural network model, a plurality of first embedding vectors, and content information related to each of the plurality of first embedding vectors; and
   one or more processors,
   wherein the one or more computer programs include computer-executable instructions that, when executed by the one or more processors, cause the electronic apparatus to:
   obtain, through the input interface, a sketch input from a user,
   obtain a second embedding vector by inputting the sketch input into the neural network model,
   identify a first embedding vector, from among the plurality of first embedding vectors, having a highest similarity with the second embedding vector,
   obtain, from the content information related to each of the plurality of first embedding vectors, image content and text content corresponding to the identified first embedding vector, and
   control the communication interface to transmit at least one content of a plurality of content to an external device,
   wherein the one or more computer programs further include computer-executable instructions that, when executed by the one or more processors, cause the electronic apparatus to:
   receive information regarding a type of the external device from the external device through the communication interface,
   identify the at least one content of the plurality of content corresponding to the type of external device, and
   control the communication interface to transmit information regarding the at least one content to the external device.

2. The electronic apparatus of claim 1, wherein the one or more computer programs further include computer-executable instructions that, when executed by the at least one or more processors, cause the electronic apparatus to:
   calculate a similarity through a cosine similarity between each of the plurality of first embedding vectors and the second embedding vector.

3. The electronic apparatus of claim 1, wherein the neural network model comprises:
   an encoder configured to obtain a feature vector based on the sketch input; and
   a decoder configured to obtain the second embedding vector based on the feature vector.

4. The electronic apparatus of claim 1,
wherein the content information related to each of the plurality of first embedding vectors comprises a plurality of types of content information, and
wherein the plurality of types of content information comprises the image content, audio content, the text content, and document content.

5. The electronic apparatus of claim 4, wherein the one or more computer programs further include computer-executable instructions that, when executed by the one or more processors, cause the electronic apparatus to:
obtain a user command to select a type of content information from among the plurality of types of content information, and
identify and output content information corresponding to the selected type of content information from among the plurality of types of the content information.

6. The electronic apparatus of claim 4, wherein the one or more computer programs further include computer-executable instructions that, when executed by the one or more processors, cause the electronic apparatus to:
identify a type of content information from among the plurality of types of content information based on type information of the electronic apparatus, and
identify and output content information of the identified type from among content information corresponding to the identified first embedding vector.

7. The electronic apparatus of claim 1, wherein the one or more computer programs further include computer-executable instructions that, when executed by the one or more processors, cause the electronic apparatus to:
obtain the sketch input based on a user input touching the touch panel.

8. The electronic apparatus of claim 1, wherein the one or more computer programs further include computer-executable instructions that, when executed by the one or more processors, cause the electronic apparatus to:
obtain, through the camera, a gesture input of the user, and
obtain the sketch input based on the gesture input.

9. The electronic apparatus of claim 1,
wherein the image content and the text content corresponding to the identified first embedding vector are provided based on a type of content information being selected from among a plurality of types of content information, and
wherein the one or more computer programs further include computer-executable instructions that, when executed by the one or more processors, cause the electronic apparatus to:
based on a first type of content information being selected from among the plurality of types of content information while displaying the sketch input, output a plurality of images corresponding to the identified first embedding vector, and
based on a second type of content information being selected from among the plurality of types of content information while displaying the sketch input, output a plurality of text documents corresponding to the identified first embedding vector.

10. A method of controlling an electronic apparatus, the method comprising:
storing, by the electronic apparatus, a neural network model, a plurality of first embedding vectors, and content information related to each of the plurality of first embedding vectors;
obtaining, by the electronic apparatus through an input interface comprising at least one of a touch panel or a camera of the electronic apparatus, a sketch input from a user;
obtaining, by the electronic apparatus, a second embedding vector by inputting the sketch input into the neural network model;
identifying, by the electronic apparatus, a first embedding vector, from among the plurality of first embedding vectors, having a highest similarity with the second embedding vector;
obtaining, by the electronic apparatus from the content information related to each of the plurality of first embedding vectors, image content and text content corresponding to the identified first embedding vector; and
transmitting at least one content of a plurality of content to an external device,
wherein the method further comprises:
receiving information regarding a type of the external device from the external device;
identifying the at least one content of the plurality of content corresponding to the type of external device; and
transmitting information regarding the at least one content to the external device.

11. The method of claim 10, wherein the identifying of the first embedding vector comprises calculating a similarity through a cosine similarity between each of the plurality of first embedding vectors and the second embedding vector.

12. The method of claim 10, wherein the neural network model comprises:
an encoder configured to obtain a feature vector based on the sketch input; and
a decoder configured to obtain the second embedding vector based on the feature vector.

13. The method of claim 10,
wherein the content information related to each of the plurality of first embedding vectors comprises a plurality of types of content information, and
wherein the plurality of types of content information comprises the image content, audio content, the text content, and document content.

14. The method of claim 13, further comprising:
obtaining, by the electronic apparatus, a user command to select a type of content information from among the plurality of types of content information,
wherein the obtaining of the image content and text content comprises:
identifying, by the electronic apparatus, content information corresponding to the selected type from among the plurality of types of content information, and
outputting, by the electronic apparatus, the identified content information.

15. The method of claim 13, further comprising:
identifying, by the electronic apparatus, a type of content information from among the plurality of types of content information based on type information of the electronic apparatus,
wherein the obtaining of the image content and text content comprises identifying, by the electronic apparatus, and outputting, by the electronic apparatus, content information corresponding to the identified type from among content information corresponding to the identified first embedding vector.

16. One or more non-transitory computer-readable storage media storing one or more computer programs including computer-executable instructions that, when executed by one or more processors of an electronic apparatus, cause the electronic apparatus to perform operations, the operations comprising:

storing, by the electronic apparatus, a neural network model, a plurality of first embedding vectors, and content information related to each of the plurality of first embedding vectors;

obtaining, by the electronic apparatus through an input interface comprising at least one of a touch panel or a camera of the electronic apparatus, a sketch input from a user;

obtaining, by the electronic apparatus, a second embedding vector by inputting the sketch input into the neural network model;

identifying, by the electronic apparatus, a first embedding vector, from among the plurality of first embedding vectors, having a highest similarity with the second embedding vector;

obtaining, by the electronic apparatus from the content information related to each of the plurality of first embedding vectors, image content and text content corresponding to the identified first embedding vector;

transmitting, by the electronic apparatus to an external device, at least one content of a plurality of content;

receiving, by the electronic apparatus from the external device, information regarding a type of the external device;

identifying, by the electronic apparatus, the at least one content of the plurality of content corresponding to the type of external device; and transmitting, by the electronic apparatus to the external device, information regarding the at least one content.

\* \* \* \* \*